US012142286B2

(12) United States Patent
Neuendorf et al.

(10) Patent No.: US 12,142,286 B2
(45) **Date of Patent: *Nov. 12, 2024**

(54) AUDIO DECODER, AUDIO ENCODER, METHOD FOR PROVIDING A DECODED AUDIO SIGNAL, METHOD FOR PROVIDING AN ENCODED AUDIO SIGNAL, AUDIO STREAM, AUDIO STREAM PROVIDER AND COMPUTER PROGRAM USING A STREAM IDENTIFIER

(71) Applicant: Fraunhofer-Gesellschaft zur Foerderung der angewandten Forschung e.V., Munich (DE)

(72) Inventors: Max Neuendorf, Nuremberg (DE); Matthias Felix, Erlangen (DE); Matthias Hildenbrand, Erlangen (DE); Lukas Schuster, Litzendorf (DE); Ingo Hofmann, Nuremberg (DE); Bernd Herrmann, Erlangen (DE); Nikolaus Rettelbach, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,623

(22) Filed: Oct. 23, 2023

(65) Prior Publication Data

US 2024/0062768 A1 Feb. 22, 2024

Related U.S. Application Data

(63) Continuation of application No. 17/538,847, filed on Nov. 30, 2021, now Pat. No. 11,837,247, which is a
(Continued)

(30) Foreign Application Priority Data

Jan. 10, 2017 (EP) .................................... 17150915
Jan. 11, 2017 (EP) .................................... 17151083

(51) Int. Cl.
*G10L 15/22* (2006.01)
*G10L 19/16* (2013.01)
*G10L 19/22* (2013.01)

(52) U.S. Cl.
CPC ............ *G10L 19/22* (2013.01); *G10L 19/167* (2013.01)

(58) Field of Classification Search
None
See application file for complete search history.

(56) References Cited

U.S. PATENT DOCUMENTS 6,240,388 B1 5/2001 Fukuchi
6,904,089 B1 6/2005 Sueyoshi et al.
(Continued)

FOREIGN PATENT DOCUMENTS

CN 102576559 A 7/2012
CN 102667921 A 9/2012
(Continued)

OTHER PUBLICATIONS

ATSC Standard: Digital Audio Compression (AC-3). Advanced Television Systems Committee. Doc.A/52:2012. Dec. 17, 2012.
(Continued)

*Primary Examiner* — Neeraj Sharma
(74) *Attorney, Agent, or Firm* — PERKINS COIE LLP; Michael A. Glenn

(57) ABSTRACT

An audio decoder for providing a decoded audio signal representation on the basis of an encoded audio signal representation is configured to adjust decoding parameters in dependence on a configuration information, to decode one or
(Continued)

more audio frames using a current configuration information, to compare a configuration information in a configuration structure associated with one or more frames to be decoded by the current configuration information, and to make a transition to perform decoding using the configuration information in the configuration structure associated with the one or more frames to be decoded as a new configuration information if the configuration information in the configuration structure associated with the one or more frames to be decoded, or a relevant portion thereof, is different from the current configuration information, and to consider a stream identifier information included in the configuration structure when comparing the configuration information.

3 Claims, 15 Drawing Sheets

Related U.S. Application Data continuation of application No. 16/506,863, filed on Jul. 9, 2019, now Pat. No. 11,217,260, which is a continuation of application No. PCT/EP2018/050575, filed on Jan. 10, 2018.

(56) References Cited

U.S. PATENT DOCUMENTS

| | | | | |
|---|---|---|---|---|
| 7,584,096 | B2 | 9/2009 | Makinen et al. | |
| 9,928,845 | B2 | 3/2018 | Fischer et al. | |
| 10,171,540 | B2 | 1/2019 | Soffer et al. | |
| 2004/0267525 | A1* | 12/2004 | Lee | G10L 19/20 704/208 |
| 2006/0174267 | A1 | 8/2006 | Schmidt | |
| 2007/0162852 | A1 | 7/2007 | Jung et al. | |
| 2007/0223538 | A1 | 9/2007 | Rodgers | |
| 2008/0046236 | A1 | 2/2008 | Thyssen et al. | |
| 2008/0151124 | A1 | 6/2008 | Lee | |
| 2010/0008448 | A1 | 1/2010 | Song et al. | |
| 2010/0129052 | A1* | 5/2010 | Fujinami | G11B 27/329 386/E5.003 |
| 2010/0153122 | A1 | 6/2010 | Wang et al. | |
| 2010/0268533 | A1* | 10/2010 | Park | G10L 25/78 704/243 |
| 2011/0032999 | A1 | 2/2011 | Chen et al. | |
| 2011/0218799 | A1 | 9/2011 | Mittal et al. | |
| 2012/0016680 | A1 | 1/2012 | Thesing et al. | |
| 2012/0069134 | A1 | 3/2012 | Garcia et al. | |
| 2012/0102538 | A1 | 4/2012 | Bansal et al. | |
| 2012/0128151 | A1 | 5/2012 | Boehm et al. | |
| 2012/0243692 | A1 | 9/2012 | Ramamoorthy | |
| 2012/0265540 | A1 | 10/2012 | Fuchs et al. | |
| 2012/0320967 | A1 | 12/2012 | Gao et al. | |
| 2013/0117032 | A1 | 5/2013 | Ip et al. | |
| 2013/0144631 | A1 | 6/2013 | Miyasaka et al. | |
| 2013/0332175 | A1 | 12/2013 | Setiawan et al. | |
| 2013/0336388 | A1* | 12/2013 | Terada | H04N 19/90 375/240.03 |
| 2014/0016785 | A1 | 1/2014 | Neuendorf et al. | |
| 2014/0074489 | A1 | 3/2014 | Chong et al. | |
| 2014/0139738 | A1 | 5/2014 | Mehta et al. | |
| 2014/0310008 | A1 | 10/2014 | Kang et al. | |
| 2015/0016537 | A1* | 1/2015 | Karczewicz | H04N 19/91 375/240.18 |
| 2015/0213808 | A1 | 7/2015 | Disch et al. | |
| 2015/0325243 | A1 | 11/2015 | Grant et al. | |
| 2015/0332677 | A1 | 11/2015 | Vasilache et al. | |
| 2016/0035355 | A1 | 2/2016 | Thesing et al. | |
| 2016/0196830 | A1 | 7/2016 | Riedmiller et al. | |
| 2016/0232910 | A1 | 8/2016 | Fischer et al. | |
| 2016/0293174 | A1 | 10/2016 | Atti et al. | |
| 2017/0076735 | A1 | 3/2017 | Beack et al. | |
| 2017/0127058 | A1* | 5/2017 | Misra | H04N 19/105 |

FOREIGN PATENT DOCUMENTS

| | | | |
|---|---|---|---|
| CN | 105745704 | A | 7/2016 |
| EP | 2863386 | A1 | 4/2015 |
| JP | H1028057 | A | 1/1998 |
| JP | 2016539357 | A | 12/2016 |
| KR | 20140018385 | A | 2/2014 |
| RU | 2589370 | C1 | 7/2016 |
| WO | 2009063467 | A2 | 5/2009 |
| WO | 2015180866 | A1 | 12/2015 |

OTHER PUBLICATIONS

ATSC Standard: Digital Audio Compression (AC-3), Advanced Television Systems Committee, Doc. A/52:2012, Dec. 17, 2012., 2012.
Anonymous, "Study on ISO/IEC 23003-3:201x/DIS of Unified Speech and Audio Coding", 96. MPEG Meeting; Mar. 21, 2011-Mar. 25, 2011; Geneva; (Motion Picture Expert Group or ISO/IEC JTC1/SC29/WG11), No. N12013, XP030018506, Apr. 22, 2011, 34 pp.
ISO, "Part 1 of 3: 4496-3, Information technology—Coding of audio-visual objects", Part 3: Audio, 2009, 2009.
ISO/IEC, "14496-3:2009 FDAM 1, Information technology—Coding of audio-visual objects", Part 3: Audio, Amendment 1: HD-AAC profile and MPEG Surround signaling, 2009, 2009.
ISO/IEC, "14496-3:2009 FDAM 2, Information technology—Coding of audio-visual objects", Part 3: Audio, Amendment 2: ALS simple profile and transport of SAOC, 2010, 2010.
ISO/IEC, "14496-3:2009 FDAM 3, Information technology—Coding of audio-visual objects", Part 3: Audio, Amendment 3: Transport of unified speech and audio coding (USAC), 2012, 2012.
ISO/IEC, "14496-3:2009/Amd.3:2012/Cor.1:2015(E), Information technology—Generic coding of moving pictures and associated audio information", Part 3: Part 3: Audio, Amendment 3: Transport of unified speech and audio coding (USAC), Technical Corrigendum 1, 2015, 2015.
ISO/IEC, "14496-3:2009/Amd.4:2013/Cor.1:2014(E), Information technology—Coding of audio-visual objects", Part 3: Audio, Amendment 4: New levels for AAC profiles, Technical Corrigendum 1, 2014, 2014.
ISO/IEC, "14496-3:2009/Amd.5:2015(E), Information technology—Coding of audio-visual objects", Part 3: Audio, Amendment 5: Support for Dynamic Range Control, New Levels for ALS Simple Profile, and Audio Synchronization, 2015, 2015.
ISO/IEC, "14496-3:2009/Cor.6:2015(E), Information technology—Coding of audio-visual objects", Part 3: Audio, Technical Corrigendum 6, 2015, 2015.
ISO/IEC, "14496-3:2009/Cor.7:2015(E), Information technology—Coding of audio-visual objects", Part 3: Audio, Technical Corrigendum 7, 2015, 2015.
ISO/IEC, "14496-3:2009/FDAM 4:2013(E), Information technology—Coding of audio-visual objects", Part 3: Audio, Amendment 4: New levels for AAC profiles, 2013, 2013.
ISO/IEC, "23003-3:2012/Amd.1/Cor.1:2014(E), Information technology—MPEG audio technologies", Part 3: Unified speech and audio coding, Amendment 1: Conformance, Technical Corrigendum 1, 2014., 2014.
ISO/IEC, "23003-3:2012/Amd.1:2014/Cor.2:2016(E), Information technology—MPEG audio technologies", Part 3: Unified speech and audio coding, Amendment 1: Conformance, Technical Corrigendum 2, 2016., 2016.
ISO/IEC, "23003-3:2012/Amd.2/Cor.1:2014(E), Information technology—MPEG audio technologies", Part 3: Unified speech and audio coding, Amendment 2: Reference Software, Technical Corrigendum 1, 2014, 2014.
ISO/IEC, "23003-3:2012/Cor.1:2012(E), "Information technology—MPEG audio technologies, Part 3: Unified speech and audio coding, Technical Corrigendum 1, 2012., 2012.
ISO/IEC, "23003-3:2012/Cor.2:2013(E), Information technology—MPEG audio technologies", Part 3: Unified speech and audio coding, Technical Corrigendum 2, 2013, 2013.

(56) References Cited

OTHER PUBLICATIONS

ISO/IEC, "23003-3:2012/Cor.3:2014(E), Information technology—MPEG audio technologies", Part 3: Unified speech and audio coding, Technical Corrigendum 3, 2014., 2014.
ISO/IEC, "23003-3:2012/Cor.4:2015(E), Information technology—MPEG audio technologies", Part 3: Unified speech and audio coding, Technical Corrigendum 4, 2015, 2015.
ISO/IEC, "23003-3:2012/FDAM 1:2013(E), Information technology—MPEG audio technologies", Part 3: Unified speech and audio coding, Amendment 1: Conformance, 2013., 2013.
ISO/IEC, "23003-3:2012/FDAM 2:2012(E), Information technology—MPEG audio technologies", Part 3: Unified speech and audio coding, Amendment 2: Reference software, 2012., 2012.
ISO/IEC, "23003-3:2012/FDAM 3:2016(E), Information technology—MPEG audio technologies", Part 3: Unified speech and audio coding, Amendment 3: Support of MPEG-D DRC, Audio Pre-Roll and Immediate Play-Out Frame, 2016., 2016.
ISO/IEC, "23008-3:2015(E), Information technology—High efficiency coding and media delivery in heterogeneous environments", Part 3: 3D audio, 2015, 2015.
ISO/IEC, "23008-3:2015/DAM 4, Information technology—High efficiency coding and media delivery in heterogeneous environments", Part 3: 3D Audio, Amendment 4: Carriage of System Metadata, 2015, 2015.
ISO/IEC, "23008-3:2015/FDAM 3:2016(E), Information technology—High efficiency coding and media delivery in heterogeneous environments", Part 3: 3D audio, Amendment 3: MPEG-H 3D Audio Phase 2, 2016., 2016.
ISO/IEC, "23008-3:201x/FDAM 2, Information technology—High efficiency coding and media delivery in heterogeneous environments", Part 3: 3D audio, Amendment 2: MPEG-H 3D Audio File Format Support, 2015, 2015.
ISO/IEC, "23009-1, Information technology—Dynamic adaptive streaming over http (DASH)", Part 1: Media presentation description and segment formats, 2014, 2014.
ISO/IEC, "23009-1:2014/ Cor.3:2016(E), Information technology—Dynamic adaptive streaming over HTTP (DASH)", Part 1: Media presentation description and segment formats, Technical Corrigendum 3, 2012, 2012.
ISO/IEC, "23009-1:2014/AMD 4, Information technology—Dynamic adaptive streaming over HTTP (DASH)", Part 1: Media presentation description and segment formats, Amendment 4: Segment Independent SAP Signalling (SISSI), MPD chaining, MPD reset and other extensions, 2017, 2017.
ISO/IEC, "23009-1:2014/Cor.2:2015(E), Information technology—Dynamic adaptive streaming over HTTP (DASH)", Part 1: Media presentation description and segment formats, Technical Corrigendum 2, 2012, 2012.
ISO/IEC, "23009-1:2014/FDAM 3, Information technology—Dynamic adaptive streaming over HTTP (DASH)", Part 1: Media presentation description and segment formats, Amendment 3: Authentication, MPD linking, Callback Event, Period Continuity and other Extensions, 2015, 2015.
ISO/IEC, "23009-1:2014/PDAM 1, Information technology—Dynamic adaptive streaming over HTTP (DASH)", Part 1: Media presentation description and segment formats / Amendment 1: High Profile and Availability Time Synchronization, 2014, 2014.
ISO/IEC, "23009-1:2015/FDAM 2:2015(E), Information Technology—Dynamic adaptive streaming over HTTP (DASH)", Part 1: Media presentation description and segment formats / Amendment 2: Spatial Relationship Description, Generalized URL parameters and other extensions, 2015, 2015.
ISO/IEC, 23009-1:201x/Cor.1:2014(E), "Information technology—Dynamic adaptive streaming over HTTP (DASH)", Part 1: Media presentation description and segment formats, Technical Corrigendum 1, 2012, 2012.
ISO/IEC, "FDIS 23003-3, Information technology—MPEG audio technologies", Part 3: Unified speech and audio coding, 2011., 2011.
ISO/IEC, "International Standard ISO/IEC 14496-3:2009 Technical Corrigendum 1, Information technology—Coding of audio-visual objects", Part 3: Audio, Technical Corrigendum 1, 2009, 2009.
ISO/IEC, "International Standard ISO/IEC 14496-3:2009 Technical Corrigendum 2, Information technology—Coding of audio-visual objects", Part 3: Audio Technical Corrigendum 2, 2011, 2011.
ISO/IEC, "International Standard ISO/IEC 14496-3:2009 Technical Corrigendum 3, Information technology—Coding of audio-visual objects", Part 3: Audio, Technical Corrigendum 3, 2012, 2012.
ISO/IEC, "International Standard ISO/IEC 14496-3:2009 Technical Corrigendum 4, Information technology—Coding of audio-visual objects", Part 3: Audio, Technical Corrigendum 4, 2012, 2012.
ISO/IEC, "International Standard ISO/IEC 14496-3:2009 Technical Corrigendum 5, Information technology—Coding of audio-visual objects", Part 3: Audio, Technical Corrigendum 5, 2015, 2015.
ISO/IEC, "JTC 1/SC 29 N, Information technology—High efficiency coding and media delivery in heterogeneous environments", Part 3: 3D Audio, Technical Corrigendum 1, 2016, 2016.
ISO/IEC, "JTC 1/SC 29, Information technology—High efficiency coding and media delivery in heterogeneous environments", Part 3: 3D audio, Amendment 1: MPEG-H, 3D Audio Profiles and Levels, 2016, 2016.
ISO/IEC, "Part 1 of 9—Text of ISO/IEC 23003-3:2012/FDAM 3 Support of MPEG-D DRC, Audio Pre-Roll and IPF", 114. MPEG Meeting; Feb. 22, 2016-Feb. 26, 2016; San Diego; (Motion Picture Expert Group or ISO/IEC JTC1/SC29/WG11), No. N16083, XP030022756, Mar. 2, 2016, 274 pp.
ISO/IEC, "Part 2 of 3: 14496-3, Information technology—Coding of audio-visual objects", Part 3: Audio, 2009, 2009.
ISO/IEC, "Part 2 of 9—Text of ISO/IEC 23003-3:2012/FDAM 3 Support of MPEG-D DRC, Audio Pre-Roll and IPF", 114. MPEG Meeting; Feb. 22, 2016-Feb. 26, 2016; San Diego; (Motion Picture Expert Group or ISO/IEC JTC1/SC29/WG11), No. N16083, XP030022756, Mar. 2, 2016, 274 pp.
ISO/IEC, "Part 3 of 3: 14496-3, Information technology—Coding of audio-visual objects", Part 3: Audio, 2009, 2009.
ISO/IEC, "Part 3 of 9—Text of ISO/IEC 23003-3:2012/FDAM 3 Support of MPEG-D DRC, Audio Pre-Roll and IPF", 114. MPEG Meeting; Feb. 22, 2016-Feb. 26, 2016; San Diego; (Motion Picture Expert Group or ISO/IEC JTC1/SC29/WG11), No. N16083, XP030022756, Mar. 2, 2016, 274 pp.
ISO/IEC, "Part 4 of 9—Text of ISO/IEC 23003-3:2012/FDAM 3 Support of MPEG-D DRC, Audio Pre-Roll and IPF", 114. MPEG Meeting; Feb. 22, 2016-Feb. 26, 2016; San Diego; (Motion Picture Expert Group or ISO/IEC JTC1/SC29/WG11), No. N16083, XP030022756, Mar. 2, 2016, 274 pp.
ISO/IEC, "Part 5 of 9—Text of ISO/IEC 23003-3:2012/FDAM 3 Support of MPEG-D DRC, Audio Pre-Roll and IPF", 114. MPEG Meeting; Feb. 22, 2016-Feb. 26, 2016; San Diego; (Motion Picture Expert Group or ISO/IEC JTC1/SC29/WG11), No. N16083, XP030022756, Mar. 2, 2016, 274 pp.
ISO/IEC, "Part 6 of 9—Text of ISO/IEC 23003-3:2012/FDAM 3 Support of MPEG-D DRC, Audio Pre-Roll and IPF", 114. MPEG Meeting; Feb. 22, 2016-Feb. 26, 2016; San Diego; (Motion Picture Expert Group or ISO/IEC JTC1/SC29/WG11), No. N16083, XP030022756, Mar. 2, 2016, 274 pp.
ISO/IEC, "Part 7 of 9—Text of ISO/IEC 23003-3:2012/FDAM 3 Support of MPEG-D DRC, Audio Pre-Roll and IPF", 114. MPEG Meeting; Feb. 22, 2016-Feb. 26, 2016; San Diego; (Motion Picture Expert Group or ISO/IEC JTC1/SC29/WG11), No. N16083, XP030022756, Mar. 2, 2016, 274 pp.
ISO/IEC, "Part 8 of 9—Text of ISO/IEC 23003-3:2012/FDAM 3 Support of MPEG-D DRC, Audio Pre-Roll and IPF", 114. MPEG Meeting; Feb. 22, 2016-Feb. 26, 2016; San Diego; (Motion Picture Expert Group or ISO/IEC JTC1/SC29/WG11), No. N16083, XP030022756, Mar. 2, 2016, 274 pp.
ISO/IEC, "Part 9 of 9—Text of ISO/IEC 23003-3:2012/FDAM 3 Support of MPEG-D DRC, Audio Pre-Roll and IPF", 114. MPEG Meeting; Feb. 22, 2016-Feb. 26, 2016; San Diego; (Motion Picture Expert Group or ISO/IEC JTC1/SC29/WG11), No. N16083, XP030022756, Mar. 2, 2016, 274 pp.

(56) References Cited

OTHER PUBLICATIONS

Kratschmer, Michael, et al., "Support of MPEG-D DRC in USAC", 111. MPEG Meeting; Jun. 2, 2015-Feb. 20, 2015; Geneva; (Motion Picture Expert Group or ISO/IEC JTC1/SC29/WG11), No. m35898, XP030064266, 6 pp.
Neuendorf, Max, et al., "Proposal for new configuration extension to MPEG-D USAC", 117. MPEG Meeting; Jan. 16, 2017-Jan. 20, 2017; Geneva; (Motion Picture Expert Group or ISO/IEC JTC1/SC29/WG11), No. m39882, XP030068227, 2 pp.
Neuendorf, Max, et al., "Update to USAC Conference", 119. MPEG Meeting; Jul. 17, 2017-Jul. 21, 2017; Torino; (Motion Picture Expert Group or ISO/IEC JTC1/SC29/WG11), No. m41126, XP030069469, 4 pp.
Pak, Daehyun, et al., "Low-delay stream switch method for real-time transfer protocol", The 18th IEEE International Symposium on Consumer Electronics (ISCE 2014), IEEE, Jun. 22, 2014, IEL Online (IEEE Xplore), URL, https://ieeexplore.ieee.org/document/6884494.
Song, Eunwoo, et al., "Fixed-point implementation of MPEG-D unified speech and audio coding decoder", Proceedings of the19th International Conference on Digital Signal Processing; pp. 110-113; Aug. 2014.
Wang, Y. K. , et al., "RTP Payload Format for H.264 Video", Internet Engineering Task Force (IETF) Y.-K. Wang, R. Even, Pub date: May 31, 2011 (101 pages).
RTP Payload Format for H.264 Video Internet Engineering Task Force (Ietf) Y.-K. Wang, R. Even, Pub date:May 31, 2011 (101 pages).

* cited by examiner

1010

Syntax of UsacConfig()

| Syntax | No. of bits | Mnemonic |
| --- | --- | --- |
| UsacConfig() | | |
| { | | |
| usacSamplingFrequencyIndex; (1020a) | 5 | bslbf |
| if ( usacSamplingFrequencyIndex == 0x1f ){ | | |
| usacSamplingFrequency; (1020b) | 24 | uimsbf |
| } | | |
| coreSbrFrameLengthIndex; (1022a) | 3 | uimsbf |
| channelConfigurationIndex; (1024a) | 5 | uimsbf |
| if ( channelConfigurationIndex == 0 ){ | | |
| UsacChannelConfig(); (1024b) | | |
| } | | |
| UsacDecoderConfig(); (1026a) | | |
| if ( usacConfigExtensionPresent == 1 ){ | 1 | uimsbf |
| UsacConfigExtension(); (1028a) | | |
| } | | |
| } | | |

can be modified

Fig. 10a

1030

Syntax of UsacConfigExtension()

| Ref. | Syntax | No. of bits | Mne-monic | |
|---|---|---|---|---|
| | UsacConfigExtension() | | | |
| | { | | | |
| 1040a | numConfigExtensions = escapedValue(2,4,8) + 1; | | | different encoding possible |
| | | | | |
| | for (confExtIdx=0; confExtIdx<numConfigExtensions; confExtIdx++) { | | | |
| 1042a | usacConfigExtType[confExtIdx] = | | | different encoding possible |
| | escapedValue(4,8,16); | | | |
| 1044a | usacConfigExtLength[confExtIdx] = | | | |
| | escapedValue(4,8,16); | | | |
| | | | | |
| | switch (usacConfigExtType[confExtIdx]) { | | | |
| 1046a | case ID_CONFIG_EXT_FILL: | | | |
| | while (usacConfigExtLength[confExtIdx]--) { | | | optional |
| | fill_byte[i]; /* should be '10100101' */ | 8 | uimsbf | |
| | } | | | |
| | break; | | | |
| 1048a | case ID_CONFIG_EXT_LOUDNESS_INFO: | | | optional |
| | loudnessInfoSet() | | | |
| | break; | | | |
| 1050a | case ID_CONFIG_EXT_STREAM_ID: | | | |
| | streamId(); | | | |
| | break; | | | |
| | default: | | | |
| | while (usacConfigExtLength[confExtIdx]--) { | | | optional |
| | tmp; | 8 | uimsbf | |
| | } | | | |
| | break; | | | |
| | } | | | |
| | } | | | |
| | } | | | |

Fig. 10b

Syntax of StreamId()

| Syntax | No. of bits | Mnemonic |
|---|---|---|
| StreamId() | | |
| { | | |
| streamIdentifier | 16 | Uimsbf |
| } | | |

Fig. 10c

| usacConfigExtType | Value |
|---|---|
| ID_CONFIG_EXT_FILL | 0 |
| /* reserved for ISO use */ | 1 |
| ID_CONFIG_EXT_LOUDNESS_INFO | 2 |
| /* reserved for ISO use */ | 3...6 |
| ID_CONFIG_EXT_STREAM_ID | 7 |
| /* reserved for ISO use */ | 8-127 |
| /* reserved for use outside of ISO scope */ | 128 and higher |

Fig. 10d

AUDIO DECODER, AUDIO ENCODER, METHOD FOR PROVIDING A DECODED AUDIO SIGNAL, METHOD FOR PROVIDING AN ENCODED AUDIO SIGNAL, AUDIO STREAM, AUDIO STREAM PROVIDER AND COMPUTER PROGRAM USING A STREAM IDENTIFIER

CROSS-REFERENCES TO RELATED APPLICATIONS

This application is a continuation of copending U.S. patent application Ser. No. 17/538,847, filed on Nov. 30, 2021, which in turn is a continuation of copending U.S. patent application Ser. No. 16/506,863, filed Jul. 9, 2019, which in turn is a continuation of copending International Application No. PCT/EP2018/050575, filed Jan. 10, 2018, which is incorporated herein by reference in its entirety, and additionally claims priority from European Applications Nos. EP 17150915.1, filed Jan. 10, 2017, and EP 17151083.7, filed Jan. 11, 2017, both of which are incorporated herein by reference in their entirety.

Embodiments according to the invention are related to an audio decoder for providing a decoded audio signal representation on the basis of an encoded audio signal representation.

Further embodiments according to the invention are related to an audio encoder for providing an encoded audio signal representation.

Further embodiments according to the invention are related to a method for providing a decoded audio signal representation.

Further embodiments according to the invention are related to a method for providing an encoded audio signal representation.

Further embodiments according to the invention are related to an audio stream.

Further embodiments according to the invention are related to an audio stream provider.

Further embodiments according to the invention are related to a computer program for performing one of the methods.

BACKGROUND OF THE INVENTION

In the following, problems underlying aspects of the invention and possible use scenarios for embodiments according to the invention will be described.

There are situations in which there are transitions between different audio streams or between different sequences of encoded audio frames. For example, different sequences of audio frames may comprise different audio contents, between which a transition should be made.

For example, when MPEG-D USAC (ISO/IEC 23003-3+Amd.1+Amd.2+Amd.3) is employed in an adaptive streaming use case, a situation may occur in which two streams within a so-called adaptation set (which may, for example, group two or more streams between which a user can switch) have exactly identical configuration structures even though their bit rates are different. This can, for example, happen if the encoder simply chooses to operate the encoder with the exact same encoding tool set for both bit rates.

For example, an audio encoder may use the same fundamental encoding settings (which are also signaled to an audio decoder), but may still provide different representations of the audio values. For example, the audio encoder may use a coarser quantization of spectral values, which results in a smaller bit demand, when it is desired to achieve a lower bit rate, even though the fundamental encoder settings or decoder settings remain unchanged.

However, this (for example, the occurrence of a situation in which two streams within an adaptation set have exactly identical configuration structures even though their bit rates are different) is not problematic as such.

However, it has been found that, in an adaptive streaming use case, the decoder should know whether or not subsequently received access units (or "frames") stem from the same stream or whether a stream change has occurred.

It has been found that, if a change of streams has been detected, an audio decoder will in some cases run through a specified sequence of operational steps which ensure the following:

- One decoder instance is properly shut down and temporarily internally stored decoded signal portions are fed to the decoder output—a process called "flushing".
- The decoder will re-instantiate and re-configure itself using the configuration information associated with the changed stream.
- The decoder will "pre-roll" embedded access units which are piggy-backed in an immediate playout frame (IPF). This pre-rolling of access units puts the decoder in a fully initialized state, such that the output from decoding the first frame results in a fully compliant decoded audio signal.
- Optionally, for example depending on a corresponding bit stream signaling element, the audio output from the decoder flushing process and the output from decoding the first access unit of the re-configured decoder are crossfaded over a very short period of time.

All of the above steps may, for example, be run to achieve the sole goal of obtaining a "seamless" transition from the decoded audio of one stream to the decoded audio of another stream. "seamless" means that there are no audible artefacts nor glitches from the stream transitions itself. The stream transition may, in fact, be perceptually noticeable because—for example—of a variation in overall coding quality or audio bandwidth or timbre. An actual point (in time) of the transition, however, does not cause an auditory impression by itself. In other words, there are no "clicks" or "noise bursts" or similar disturbing sounds at the point of transition.

It has been found that an information whether or not a stream change has occurred may be obtained from analyzing a configuration structure that is embedded in an immediate playout frame and comparing it to the configuration of the currently decoded stream. For example, an audio decoder may assume a change of stream if and only if the received configuration differs from the current one.

For example, if a decoder receives an immediate playout frame (IPF) of a stream with a varying bit rate, it detects the presence of an Audio Pre-Roll extension payload, extracts the configuration structure and will conduct a comparison between this new configuration and the current one. For further details, see also ISO/IEC 23003-3:2012/Amd.3, subclause "Bitrate adaption".

However, it has been found that if both configuration structures, current and new, are identical, the decoder will fail to recognize that it is receiving access units from a different stream than before and will thus not reconfigure the decoder nor will it decode the audio pre-roll that resides in the extension payload of the IPF.

Instead, the decoder will try to continue to decode as if it had received continued access units from the previous active stream. This will (for example, in a conventional case in which no streamID is used or evaluated) lead to the likely situation that windows borders and coding modes of the last decoded frame and the new frame of the new stream do not correspond, which in turn leads to audible artefacts, such as clicks or noise bursts. This will frustrate the main purpose of the IPFs and the adaptive audio streaming idea, which is based on the concept of seamless transitions between streams.

In the following, some conventional approaches will be described.

It should be noted that for unified-speech-and-audio-coding (USAC), there is no known solution.

In MPEG-H 3D audio (ISO/IEC 23008-3+all amendments) the problem can be solved if the audio data is transmitted by means of the MPEG-H Audio Stream ("MHAS") packetized stream format. The MHAS packages contain a packet label that can be different between streams and therefore can serve the purpose of differentiation between configurations. The MHAS format is, however, not specified for MPEG-D USAC.

In MPEG-4 HE-AAC (ISO/IEC 14496-3+all amendments) there is a workaround that involves an encoder to ensure that at the potential points of transition (so-called stream access points (SAPs)) all streams have identical window shapes and window sequences and further constraints with respect to the employed signal processing tool. This can have detrimental effects on the resulting audio quality. The above mentioned IPF was designed exactly to free a new codec of all these constraints.

To conclude, there is a demand for a concept which allows for a switching between different audio streams and which provides an improved compromise between an amount of overhead and ease of implementation.

SUMMARY

An embodiment may have an audio decoder for providing a decoded audio signal representation on the basis of an encoded audio signal representation, wherein the audio decoder is configured to adjust decoding parameters in dependence on a configuration information, wherein the audio decoder is configured to decode one or more audio frames using a current configuration information, and wherein the audio decoder is configured to compare a configuration information in a configuration structure associated with one or more frames to be decoded, with the current configuration information, and to make a transition to perform a decoding using the configuration information in the configuration structure associated with the one or more frames to be decoded as a new configuration information if the configuration information in the configuration structure associated with the one or more frames to be decoded, or a relevant portion of the configuration information in the configuration structure associated with the one or more frames to be decoded, is different from the current configuration information; wherein the audio decoder is configured to consider a stream identifier information included in the configuration structure when comparing the configuration information, such that a difference between a stream identifier previously acquired by the audio decoder and a stream identifier represented by the stream identifier information in the configuration structure associated with the one or more frames to be decoded causes to make the transition.

Another embodiment may have an audio encoder for providing an encoded audio signal representation, wherein the audio encoder is configured to encode overlapping or non-overlapping frames of an audio signal using encoding parameters, to obtain the encoded audio signal representation, wherein the audio encoder is configured to provide a configuration structure describing the encoding parameters or decoding parameters to be used by an audio decoder, wherein the configuration structure includes a stream identifier.

According to another embodiment, a method for providing a decoded audio signal representation on the basis of an encoded audio signal representation may have the steps of: adjusting decoding parameters in dependence on a configuration information, decoding one or more audio frames using a current configuration information, and comparing a configuration information in a configuration structure associated with one or more frames to be decoded, with the current configuration information, and wherein the method includes making a transition to perform a decoding using the configuration information in the configuration structure associated with the one or more frames to be decoded as a new configuration information if the configuration information in the configuration structure associated with the one or more frames to be decoded, or a relevant portion of the configuration information in the configuration structure associated with the one or more frames to be decoded, is different from the current configuration information; considering a stream identifier information included in the configuration structure when comparing the configuration information, such that a difference between a stream identifier previously acquired in the audio decoding and a stream identifier represented by the stream identifier information in the configuration structure associated with the one or more frames to be decoded causes to make the transition.

According to another embodiment, a method for providing an encoded audio signal representation may have the steps of: encoding overlapping or non-overlapping frames of an audio signal using encoding parameters, to obtain the encoded audio signal representation, providing a configuration structure describing the encoding parameters or decoding parameters to be used by an audio decoder, wherein the configuration structure includes a stream identifier.

According to another embodiment, an audio stream may have: an encoded representation of overlapping or non-overlapping frames of an audio signal; and a configuration structure describing encoding parameters or decoding parameters to be used by an audio decoder, wherein the configuration structure includes a stream identifier information representing a stream identifier.

Another embodiment may have an audio stream provider for providing an encoded audio signal representation, wherein the audio stream provider is configured provide encoded versions of overlapping or non-overlapping frames of an audio signal, encoded using encoding parameters, as a part of the encoded audio signal representation, wherein the audio stream provider is configured to provide a configuration structure describing the encoding parameters or decoding parameters to be used by an audio decoder as a part of the encoded audio signal representation, wherein the configuration structure includes a stream identifier.

According to another embodiment, a method for providing an encoded audio signal representation may have the steps of: providing encoded versions of overlapping or non-overlapping frames of an audio signal, encoded using encoding parameters, as a part of the encoded audio signal representation, providing a configuration structure describing the encoding parameters or decoding parameters to be used by an audio decoder as a part of the encoded audio signal representation, wherein the configuration structure includes a stream identifier.

According to another embodiment, a non-transitory digital storage medium may have a computer program stored thereon to perform any of the inventive methods when said computer program is run by a computer.

An embodiment according to the invention creates an audio decoder for providing a decoded audio signal representation on the basis of an encoded audio signal representation. The audio decoder is configured to adjust decoding parameters in dependence on a configuration information. The audio decoder is configured to decode one or more audio frames using a current configuration (for example, using a currently active configuration information). Moreover, the audio decoder is configured to compare a configuration information in a configuration structure associated with one or more frames to be decoded, with the current configuration information, and to make a transition to perform a decoding using the configuration information in the configuration structure associated with the one or more frames to be decoded as a new configuration information if the configuration information in the configuration structure associated with the one or more frames to be decoded, or a relevant portion (for example, up to and including the stream identifier) of the configuration information in the configuration structure associated with the one or more frames to be decoded, is different from the current configuration information. The audio decoder is configured to consider a stream identifier information included in the configuration structure when comparing the configuration information, such that a difference between a stream identifier previously acquired by the audio decoder and a stream identifier represented by the stream identifier information in the configuration structure associated with the one or more frames to be decoded causes to make the transition.

This embodiment according to the invention is based on the idea that the presence and evaluation of a stream identifier information, which is included in the configuration structure, allows for a distinction of different streams at the side of an audio decoder, and consequently the execution of a transition, even in the case that the actual decoding configuration (which may, for example, be described by the rest of the configuration information in the configuration structure), is identical for both the streams. Accordingly, the stream identifier can be used as a criterion to distinguish between different streams between which a transition can be made. Since the stream identifier information is included in the configuration structure (for example, together with other configuration information adjusting decoding parameters of the audio decoder) it is not necessary to evaluate any information from a different protocol layer when deciding whether a transition should be made. For example, the stream identifier information is included in a sub-data structure of a data structure which defines the decoding parameters (the "configurations structure"), such that it is not necessary to forward any information from a packet level to the actual audio decoder. By including into the configuration structure the stream identifier information, which allows the audio decoder to recognize a transition from a first stream to a second stream, but which does not have any impact on decoding parameters when decoding a contiguous portion of a single stream, it is possible to recognize, at the side of the audio decoder, a switching between different streams without accessing information from a different protocol level even in a situation in which identical decoding parameters are used in different streams. Also, it is not necessary to use equal decoding parameters in different streams at positions at which a switching between different streams is allowable.

To conclude, the concept as defined by the independent claim 1 allows for a recognition of a switching between different streams with moderate implementation complexity (for example, without extracting dedicated signaling information from a different protocol level and forwarding it to the audio decoder) while avoiding the need to enforce specific coding/decoding settings (such as a choice of windows, and so on) at points of transition. Thus, excessive overhead and degradation of an audio quality can also be avoided.

In an advantageous embodiment, the audio decoder is configured to check whether the configuration structure comprises the stream identifier information, and to selectively consider the stream identifier information in the comparison if the stream identifier information is included in the configuration structure. Accordingly, it is not necessary to include the stream identifier information in each configuration structure. Rather, it is possible to omit the stream identifier in configuration structures of audio frames at which a possibility for a switching between different streams is not required. Accordingly, some bits can be saved, and the evaluation of the stream identifier information can be avoided at points at which a switching between different streams is not allowable.

In an advantageous embodiment, the audio decoder is configured to check whether the configuration structure comprises a configuration extension structure and to check whether the configuration extension structure comprises the stream identifier. The audio decoder may be configured to selectively consider the stream identifier information in the comparison if the stream identifier information is included in the configuration extension structure.

Accordingly, the stream identifier can be placed in a configuration extension structure, the presence of which is optional, wherein the presence of the stream identifier information can even be considered as optional even if the configuration extension structure is present. Accordingly, the audio decoder can flexibly recognize whether the stream identifier information is present, which gives an audio encoder the possibility to avoid the inclusion of unnecessary information. Placing the stream identifier in a data structure which can be activated and deactivated (for example, by a flag in the fixed (usually present) portion of the configuration structure), the stream identifier information can be placed exactly where needed while saving bits if the stream identifier information is not needed. This is advantageous, since it is not necessary that each frame for which there is a configuration structure also includes a stream identifier information, because a switching between streams is typically only possible at specified times.

In an advantageous embodiment, the audio decoder is configured to accept a variable ordering of configuration information items in the configuration extension structure. For example, the audio decoder is configured to consider configuration information items (for example, configuration extensions) arranged in the configuration extension structure before the stream identifier information (for example, before the item named "streamID") (for example, as well as the stream identifier information) when comparing the configuration information in the configuration structure associated with one or more frames to be decoded with the current configuration information. Moreover, the audio decoder may be configured to leave configuration information items (for example, configuration extensions) arranged in the configuration extension structure (for example, "UsacConfigExtension( )") after the stream identifier information unconsidered when comparing the configuration information in the configuration structure associated with one or more frames to be decoded with the current configuration information.

By using such a concept, a detection of transitions between different streams can be made in a very flexible manner. For example, all such configuration information items which indicate “significant” changes of an audio stream can be placed in the configuration extension structure before the stream identifier information, such that a change of these parameters triggers a transition from one stream to another stream. On the other hand, by leaving some configuration information items unconsidered when comparing the information in the configuration structure associated with one or more frames to be decoded with the current configuration information, it is possible to change “subordinate” configuration parameters for the audio decoder without triggering a “transition”, i.e., a switching from one stream to another stream, which may be connected with a re-initialization. Worded differently, by only evaluating configuration information items arranged in the configuration extension structure before the stream identifier information, and the stream identifier information itself, in the comparison, it can be avoided that any change of a “subordinate” decoding parameter triggers a “transition”. Rather, it is possible for an audio encoder to place such “subordinate” configuration information items (which relate to subordinate decoding parameters) behind the stream identifier information in the configuration extension structure. Then, the audio encoder can change such “subordinate” configuration information items within a stream, without triggering a “transition” (or a re-initialization) with each of the changes. On the other hand, those configuration information items which remain unchanged during a stream can be placed before the stream identifier information in the configuration extension structure, and a change of such a “highly relevant” configuration information item (which may, for example, indicate a “significant” change of the audio stream) would result in a “transition” (and typically in a re-initialization of the audio decoder). Since the audio decoder can also accept a variable ordering of configuration information items in the configuration extension structure, an audio encoder can decide, depending on the signal characteristics or depending on other criteria, a change of which configuration information items should trigger a “transition” or a re-initialization of an audio decoder and a change of which configuration information items should be possible within a stream without triggering a “transition” or a re-initialization of the audio decoder.

In an advantageous embodiment, the audio decoder is configured to identify one or more configuration information items in the configuration extension structure on the basis of one or more configuration extension type identifiers preceding the respective configuration information items. By using such configuration extension type identifiers it is possible to implement the variable ordering of configuration information items.

In an advantageous embodiment, the configuration extension structure is a sub-data-structure of the configuration structure, wherein a presence of the configuration extension structure is indicated by a bit of the configuration structure which is evaluated by the audio decoder. The stream identifier information is a sub-data-item of the configuration extension structure, wherein a presence of the stream identifier information is indicated by a configuration extension type identifier associated with the stream identifier information which is evaluated by the audio decoder. Accordingly, it is possible to flexibly decide when a stream identifier information should be added to an audio stream, and the audio decoder can easily determine when such a stream identifier information is available. Consequently, it is sufficient to include the stream identifier information (which involves a number of bits) of an audio stream at points at which there can be a switching between different streams. Immediate playout frames (IPF) within a contiguous audio stream, at a positon where there is no possibility to switch between different streams, do not need to carry the stream identifier information, which saves bit rate.

In an advantageous embodiment, the audio decoder is configured to obtain and process an audio frame representation (for example, an immediate playout frame, IPF) which comprises a random access information (for example, an “audio pre-roll extension payload”, also designated as “AudioPreRoll( )”). The random access information comprises a configuration structure (for example, designated as “Config( )”) and information (for example, designated with “AccessUnit( )”) for bringing a state of a processing chain of the audio decoder to a desired state. The audio decoder is configured to cross-fade between an audio information represented by an audio frame processed (decoded) before arriving at the audio frame representation which comprises the random access information (for example, immediate playout frame, IPF) and an audio information derived on the basis of the audio frame representation which comprises the random access information after an initialization of the audio decoder using the configuration structure of the random access information and after adjusting a state of the audio decoder using the information for bringing a state for a processing chain to a desired state if the audio decoder finds that the configuration information in the configuration structure and (for example, “Config( )”) of the random access information, or a relevant portion of the configuration information in the configuration structure of the random access information, is different from the current configuration information. For example, if a value “numPreRollFrames” is zero, a decoding of the pre-roll frames may be omitted.

In other words, by evaluating the configuration information in the configuration structure, or of a relevant portion thereof (for example, up to and including a stream identifier information), the audio decoder can recognize whether there is a transition between different streams or not, and in the case of a transition between different streams, the audio decoder can make use of the random access information. The random access information can help to bring the processing chain of the audio decoder to the proper state (which would normally, in the absence of a transition, be effected by one or more previous frames), to thereby avoid artifacts at the transition. To conclude, this concept allows for artifact free switching between different streams, wherein the audio decoder does not need any information from a different protocol level, except for a sequence of frame representations.

In an advantageous embodiment, the audio decoder is configured to continue decoding without performing an initialization of the audio decoder and without using the information for bringing a state of the processing chain of the audio decoder to a desired state (for example, a pre-roll extension payload) if the audio decoder has decoded an audio frame directly preceding an audio frame represented by the audio frame representation which comprises the random access information (for example, an immediate playout frame) and if the audio decoder finds that the relevant portion of the configuration information in the configuration structure of the random access information is equal to the current configuration information. Accordingly, if the audio decoder recognizes, by comparing the relevant portion of the configuration information in the configuration structure to the current configuration information, that there is no transition between different streams but rather a contiguous playout of the same stream, the overhead (for example, a processing overhead or computational overhead) which would be caused by performing of an initialization of the audio decoder is avoided. Thus, a high level of efficiency is achieved, and the initialization of the audio decoder is only performed when it is needed.

In an advantageous embodiment, the audio decoder is configured to perform an initialization of the audio decoder using the configuration structure of the random access information and to adjust a state of the audio decoder using the information for bringing a state of the processing chain to a desired state if the audio decoder has not decoded an audio frame directly preceding an audio frame represented by the audio frame representation which comprises the random access information. In other words, if there is an actual "random access" (wherein the audio decoder knows that the preceding audio frame has not decoded) the initialization is also performed. Thus, the random access information is used in the case of a real "random access" (i.e., when jumping to a certain frame) and when switching between different streams (wherein a "real" random access may be signaled to the audio decoder, and wherein a switching between different streams may only be recognizable by the audio decoder by an evaluation of the stream identifier information).

It should be noted that the audio decoder as discussed here can optionally be supplemented by any of the features, functionalities and details described herein, either individually or in combination.

An embodiment according to the invention creates an audio encoder for providing an encoded audio signal representation. The audio encoder is configured to encode overlapping or non-overlapping frames of an audio signal using encoding parameters, to obtain the encoded audio signal representation. The audio encoder is configured to provide a configuration structure describing the encoding parameters (or, equivalently, decoding parameters to be used by an audio decoder). The configuration structure also comprises a stream identifier.

Accordingly, the audio encoder provides an audio signal representation which is well-useable by the audio decoder mentioned above. For example, the audio encoder may include different stream identifiers in configuration structures of different streams. Accordingly, the stream identifier may be an information which does not describe a decoder configuration (or decoding parameter) to be used by an audio decoder but rather identifies a stream. Accordingly, the encoded audio signal representation comprises a stream identifier, and the identification of different streams is possible on the basis of the encoded audio signal information itself without requiring any information from a different protocol level. For example, the usage of information which is provided on a packet level is not necessary, since the stream identifier information is an integral part of the audio signal representation, or of the configuration structure included within the audio signal representation. Consequently, audio decoders, as discussed herein, can recognize a switching between different streams, even if the actual configuration parameters of the decoder remain unchanged.

In an advantageous embodiment, the audio encoder is configured to include the stream identifier in a configuration extension structure of the configuration structure, wherein the configuration extension structure comprising the stream identifier can be enabled and disabled by the audio encoder. Accordingly, it is possible to flexibly decide, at the side of the audio encoder, whether the stream identifier information should be included or not. For example, the inclusion of the stream identifier information can selectively be omitted for audio frames for which the audio encoder knows that there will be no stream switching.

In an advantageous embodiment, the audio encoder is configured to include into the configuration extension structure a configuration extension type identifier designating the stream identifier, to signal the presence of the stream identifier in the configuration extension structure. Accordingly, it is possible to even omit the stream identifier information if other configuration extension information is present in the configuration extension structure. In other words, not every configuration extension structure necessarily needs to comprise the stream identifier, which helps to save bits.

In an advantageous embodiment, the audio encoder is configured to provide at least one configuration structure comprising the stream identifier and at least one configuration structure not comprising the stream identifier. Accordingly, the stream identifier is only included in the configuration structure if the audio encoder recognizes that this is necessary. For example, the audio encoder only needs to include the stream identifier into configuration structures of frames at which a switching between streams is possible. By doing so, a bitrate can be kept reasonably small.

In an advantageous embodiment, the audio encoder is configured to switch between a provision of a first encoded audio information, which is represented by a first sequence of audio frames, and a second encoded audio information, which is represented by a second sequence of frames, wherein an appropriate rendering of the first audio frame of the second sequence of audio frames after rendering of a last frame of the first sequence of audio frames involves re-initialization of an audio decoder. In this case, the audio encoder is configured to include into an audio frame representation representing the first frame of the second sequence of audio frames a configuration structure comprising a stream identifier associated with the second sequence of audio frames. The stream identifier associated with the second sequence of audio frames is chosen to be different from a stream identifier associated with the first sequence of frames. Accordingly, an audio encoder can provide, within the configuration structure, a signaling which allows an audio decoder to distinguish between different streams and to recognize when a re-initialization (also designated as "transition") should be performed.

In an advantageous embodiment, the audio encoder does not provide any other signaling information indicating a switching from the first sequence of audio frames to the second sequence of audio frame except for the stream identifier. Accordingly, a bit rate can be kept reasonably small. In particular, it can be avoided that signaling is included in different protocol levels, other than the encoded audio information. Moreover, the audio encoder does not know beforehand when a switching from the first sequence of audio frames to the second sequence of audio frames actually takes place. For example, an audio decoder may first request audio frames from the first sequence of audio frames, and when the audio decoder recognizes some need (for example, when there is an increase or a decrease of an available bit rate) the audio decoder (or any other control device controlling the provision of audio frames) can decide that audio frames from a second stream should now be processed by the audio decoder. However, in some cases, the audio decoder may not know by itself when (or when exactly) there is a switching between a provision of audio frames from the first sequence and a provision of audio frames from the second sequence, and will only be able to recognize from which sequence of audio frames the currently received audio frames originate by evaluating the stream identifier included in the configuration structure.

In an advantageous embodiment, the audio encoder is configured to provide a first sequence of audio frames (for example, a first stream) and a second sequence of audio frames (for example, a second stream) using different bit rates (wherein the first stream and the second stream may represent the same audio content). Moreover, the audio encoder may be configured to signal to the audio decoder identical decoder configuration information for the decoding of the first sequence of audio frames and for the decoding of the second sequence of audio frames, except for different bit stream identifiers. In other words, the audio encoder may signal to the audio decoder to use identical decoder parameters, but the first stream and the second stream may still comprise different bit rates. This may, for example, be caused by using different quantization resolution or different psychoacoustic models when providing the first audio stream and the second audio stream. However, these different quantization resolutions or different psychoacoustic models do not affect the decoding parameters to be used by an audio decoder but only affect the actual bit rate. Thus, the different bit stream identifiers may be the only possibility for an audio decoder to distinguish whether an audio frame to be decoded is from the first stream or from the second stream, and the evaluation of the bit stream identifier also allows the audio decoder to recognize when a transition (or re-initialization) should be made.

Accordingly, the audio encoder can serve in environments in which changes of the available bit rate may occur, and a signaling overhead may be kept reasonably small.

Moreover, it should be noted that the audio encoder discussed here can optionally be supplemented by any of the features and functionalities and details described herein.

Another embodiment according to the invention is related to a method for providing a decoded audio signal representation on the basis of an encoded audio signal representation. The method comprises adjusting decoding parameters in dependence on a configuration information, and the method comprises decoding one or more audio frames using a current configuration information (for example, a currently active configuration information). The method also comprises comparing a configuration information in a configuration structure associated with one or more frames to be decoded with the current configuration information, and the method comprises making a transition (for example, comprising a re-initialization of the decoding) to perform a decoding using the configuration information in the configuration structure associated with the one or more frames to be decoded as a new configuration if the configuration information in the configuration structure associated with the one or more frames to be decoded, or a relevant portion (for example, up to and including the stream identifier) of the configuration information in the configuration structure associated with the one or more frames to be decoded is different from the current configuration information. The method also comprises considering a stream identifier information included in the configuration structure when comparing the configuration information, such that a difference between a stream identifier previously acquired in the audio decoding and a stream identifier represented by the stream identifier information in the configuration structure associated with the one or more frames to be decoded causes to make the transition. This method is based on the same considerations as the above mentioned audio decoder.

The method can be supplemented by any of the features and functionalities and details described herein, either individually or taken in combination.

Another embodiment according to the invention creates a method for providing an encoded audio signal representation. The method comprises encoding overlapping or non-overlapping frames of an audio signal using encoding parameters, to obtain the encoded audio signal representation. The method comprises providing a configuration structure describing the encoding parameters (or, equivalently, decoding parameters to be used by an audio decoder), wherein the configuration structure comprises a stream identifier. This method is based on the same considerations as the above mentioned audio encoder.

Moreover, it should be noted that the methods described here can be supplemented by any of the features and functionalities described above with respect to the corresponding audio decoder and audio encoder. Moreover, the methods can be supplemented by any of the features, functionalities and details described herein, individually or in combination.

Embodiments according to the invention create an audio stream. The audio stream comprises an encoded representation of overlapping or non-overlapping frames of an audio signal. The audio stream also comprises a configuration structure describing encoding parameters (or, equivalently, decoding parameters to be used by an audio decoder). The configuration structure comprises a stream identifier information representing a stream identifier (for example, in the form of an integer value).

The audio stream is based on the above mentioned considerations. In particular, the stream identifier, which is included in the configuration structure of the audio stream, which also describes encoding parameters (or, equivalently, decoding parameters to be used by an audio decoder) allows an audio decoder to distinguish between different streams, even if the same encoding parameters (or decoding parameters) are used.

In an advantageous embodiment, the stream identifier information is included in a configuration extension structure. In this case, the configuration extension structure is, advantageously, a sub-data-structure of a configuration structure, wherein a presence of a configuration extension structure is indicated by a bit of the configuration structure. Moreover, the stream identifier information is a sub-data-item of the configuration extension structure, wherein a presence of the stream identifier information is indicated by a configuration extension type identifier associated with the stream identifier information. Usage of such an audio stream allows for a flexible inclusion of the stream identifier information whenever it is needed, while the inclusion of the stream identifier information can be omitted in case it is not needed (for example, for frames for which there is no switching between multiple streams allowed). Thus, bit rate can be saved.

In an advantageous embodiment, the stream identifier is embedded in a sub-data-structure of a representation of an audio frame (and may be extracted by the audio decoder from such a sub-data-structure). By embedding the stream identifier in a sub-data-structure of a representation of an audio frame, it can be avoided that an audio decoder uses an information from a higher protocol level. Rather, for decoding an audio frame, the audio decoder only needs the representation of an audio frame and can decide whether there was a switching between different streams.

In an advantageous embodiment, the stream identifier is only embedded in a sub-data-structure of a representation of an audio frame comprising a configuration structure (and may be extracted by the audio decoder from a sub-data-structure of a representation of an audio frame comprising a configuration structure). This idea is based on the finding that a switching between streams (without noticeable artifacts) can only be performed at frames comprising a configuration structure. Accordingly, it has been found that it is sufficient to embed the stream identifier in a sub-data-structure of a representation of an audio frame comprising a configuration structure, while there is no stream identifier included in a representation of an audio frame not comprising a configuration structure.

The audio streams described herein can be supplemented by any features, functionalities and details discussed herein, either individually or in combination. In particular, such features described with respect to the audio encoders, audio decoders and stream providers can also be applied to the audio stream.

Embodiments according to the invention creates an audio stream provider for providing an encoded audio signal representation. The audio stream provider is configured to provide encoded versions of temporally overlapping or non-overlapping frames of an audio signal, encoded using encoding parameters, as a part of the encoded audio signal representation. The audio stream provider is configured to provide a configuration structure describing the encoding parameters (or, equivalently, decoding parameters to be used by an audio decoder) as a part of the encoded audio signal representation, wherein the configuration structure comprises a stream identifier. This audio stream provider is based on the same considerations as the above described audio encoder and also as the above described audio decoder.

In an advantageous embodiment, the audio stream provider is configured to provide the encoded audio signal representation such that the stream identifier is included in a configuration extension structure of the configuration structure, wherein the configuration extension structure comprising the stream identifier can be enabled and disabled by one or more bits in the configuration structure. This embodiment is based on the same ideas as discussed above with respect to the audio encoder and also with respect to the audio decoder. In other words, the audio stream provider provides an audio stream which corresponds to the audio stream provided by an audio encoder (even though the audio stream provider may be configured to switch between the provision of different streams, for example provided by multiple audio encoders operating in parallel, or provided from a storage medium).

In the advantageous embodiment, the audio stream provider is configured to provide the encoded audio signal representation such that the configuration extension structure comprises a configuration extension type identifier designating the stream identifier to signal the presence of the stream identifier in the configuration extension structure. This embodiment is based on the same considerations mentioned above with respect to the audio encoder and with respect to the audio stream.

In an advantageous embodiment, the audio stream provider is configured to provide the encoded audio signal representation such that the encoded audio signal representation comprises at least one configuration structure comprising the stream identifier and at least one configuration structure not comprising the stream identifier. As mentioned above, it is not necessary that the stream identifier is included in each configuration structure. Rather, there can be a flexible adjustment in which configuration structures the stream identifier should be included. Typically, the stream identifier will be included in configuration structures of such audio frames for which there is a switching between streams (or for which a switching between streams is anticipated or allowed). Worded differently, a switching between different streams comprising identical configuration structures, except for differing stream identifiers, will only be performed by the stream provider at frames in which a stream identifier is present. Thus, the audio decoder (receiving the encoded audio representation form the audio stream provider) has the possibility to recognize a switching between different streams, even if the decoding parameters (which are signaled by the configuration structure) are substantially identical or even fully identical.

In an advantageous embodiment, the audio stream provider is configured to switch between a provision of a first portion of an encoded audio information, which is represented by a first sequence of audio frames, and a second portion of the encoded audio information, which is represented by a second sequence of audio frames, wherein appropriate rendering of a first audio frame of the second sequence of audio frames after rendering of a last frame of the first sequence of audio frames involves re-initialization of an audio decoder. The audio stream provider is configured to provide the encoded audio signal representation such that an audio frame representation representing the first frame of the second sequence of audio frames includes a configuration structure comprising a stream identifier associated with the second sequence of audio frames, wherein the stream identifier associated with the second sequence of audio frames is different from a stream identifier associated with the first sequence of audio frames. In other words, the audio stream provider switches between two audio streams (sequences of audio frames) having associated different stream identifiers. Accordingly, an audio decoder will typically know the stream identifier associated with the first sequence of audio frames (for example, by evaluating a configuration structure associated with the first sequence of audio frames), and when the audio decoder receives the first frame of the second sequence of audio frames, the audio decoder will be able to evaluate the configuration structure comprising the stream identifier associated with the second sequence of audio frames, and will be able to recognize a switching from the first stream to the second stream by means of the comparison of the stream identifiers (which are different for the different streams). Thus, the audio stream provider provides audio frames from a first stream and then switches to a provision of audio frames from a second stream, and provides the appropriate signaling information, namely the stream identifier, within the configuration structure of the first frame of the second audio stream which is provided after the switching. Accordingly, no extra signaling is needed for signaling the switching between different audio streams.

In an advantageous embodiment, the audio stream provider is configured to provide the encoded audio signal representation such that the encoded audio signal representation does not provide any other signaling information indicating the switching from the first sequence of audio frames to the second sequence of audio frames except for the stream identifier. Accordingly, a significant saving of bit rate can be achieved. Also a protocol complexity is kept small, since it is not necessary to include any information at different protocol levels and to extract such information from different protocol levels at the side of an audio decoder.

In an advantageous embodiment, the audio stream provider is configured to provide the encoded audio signal representation such that the first sequence of audio frames (for example, a first stream) and a the second sequence of audio frames (for example, a second stream) are encoded using different bit rates. Moreover, the audio stream provider is configured to provide the encoded audio signal representation such that the encoded audio signal representation signals to an audio decoder identical decoder configuration information (or decoder parameters, or decoding parameters) for the decoding of the first sequence of audio frames and for the decoding of the second sequence of audio frames, except for different bit stream identifiers. Thus, the audio stream provider provides very similar configuration information for the different streams (first stream and second stream) which may, for example, only differ by the bit stream identifiers. In this scenario, using the bit stream identifiers is particularly helpful, since they allow to reliably distinguish between different bit streams with minimum signaling overhead.

In an advantageous embodiment, the audio stream provider is configured to switch between a provision of a first sequence of audio frames (for example, a first stream) and a second sequence of audio frames (for example, a second stream) to an audio decoder, wherein the first sequence of audio frames and the second sequence of audio frames are encoded using different bit rates. The audio stream provider is configured to selectively switch between the provision of the first sequence of audio frames and the provision of the second sequence of audio frames at an audio frame for which the audio frame representation (for example, an immediate playout frame, IPF) comprises a random access information (for example, an audio pre-roll extension payload, "AudioPreRoll( )") while avoiding to switch between sequences at audio frames which do not comprise a random access information. The audio stream provider is configured to provide the encoded audio signal representation such that a stream identifier is included in a configuration structure of an audio frame which is provided when switching from the first sequence of audio frames to the second sequence of audio frames. For example, it ensured by such a configuration of the audio stream provider that there is only a switching between a provision of frames from a first sequence of audio frames and a provision of frames of a second sequence of audio frames when the first frame of the second sequence of audio frames comprises a configuration structure having a stream identifier and also the random access information. Consequently, an audio decoder can detect the switching between the different audio streams, and can thus recognize that the random access information should be evaluated (while the random access information is typically not evaluated when there is no switching between different audio streams and when the audio decoder is of the assumption that a contiguous sequence of audio frames of a single stream is rendered).

Thus, a good audio quality without artifacts when switching between different audio streams can be achieved by such a concept.

In a further embodiment, the audio stream provider is configured to obtain a plurality of parallel sequences of audio frames encoded using different bit rates, and the audio stream provider is configured to switch between a provision of frames from different of the parallel sequences to an audio decoder, wherein the audio stream provider is configured to signal to an audio decoder to which of the sequences one or more frames are associated using the stream identifier which is included in the configuration structure of a first audio frame representation provided after a switching. Accordingly, the audio decoder can recognize a transition between different streams with a small overhead and without using information from other protocol layers.

It should be noted that the audio stream provider discussed herein can be supplemented by any of the features, functionalities and details described herein, either individually or in combination.

Another embodiment according to the invention creates a method for providing an encoded audio signal representation. The method comprises providing encoded versions of overlapping or non-overlapping frames of an audio signal, encoded using encoding parameters, as a part of the encoded audio signal representation. The method comprises providing a configuration structure describing the encoding parameters (or, equivalently, decoding parameters to be used by an audio decoder) as a part of the encoded audio signal representation, wherein the configuration structure comprises a stream identifier.

This method is based on the same considerations as the above discussed stream provider. The method can be supplemented by any other of the features, functionalities and details described herein, for example, with respect to the stream provider but also with respect to the audio encoder, the audio decoder or the audio stream.

Another embodiment according to the invention creates a computer program for performing the methods described herein.

BRIEF DESCRIPTION OF THE DRAWINGS

Embodiments of the present invention will be detailed subsequently referring to the appended drawings, in which:

FIG. 10*a* shows a representation of an example configuration structure for use by the audio encoders and audio decoders described herein; and FIG. 10*b* shows a representation of an example configuration extension structure for use by the audio encoders and audio decoders described herein.

FIG. 10*c* shows a representation of an example stream identifier bit stream element; and FIG. 10*d* shows an example of a value of "usacConfigExtType", which can optionally replace table 74 in the USAC standard;

DETAILED DESCRIPTION OF THE INVENTION

1. Audio Decoder According to FIG. 1

Figure 1:
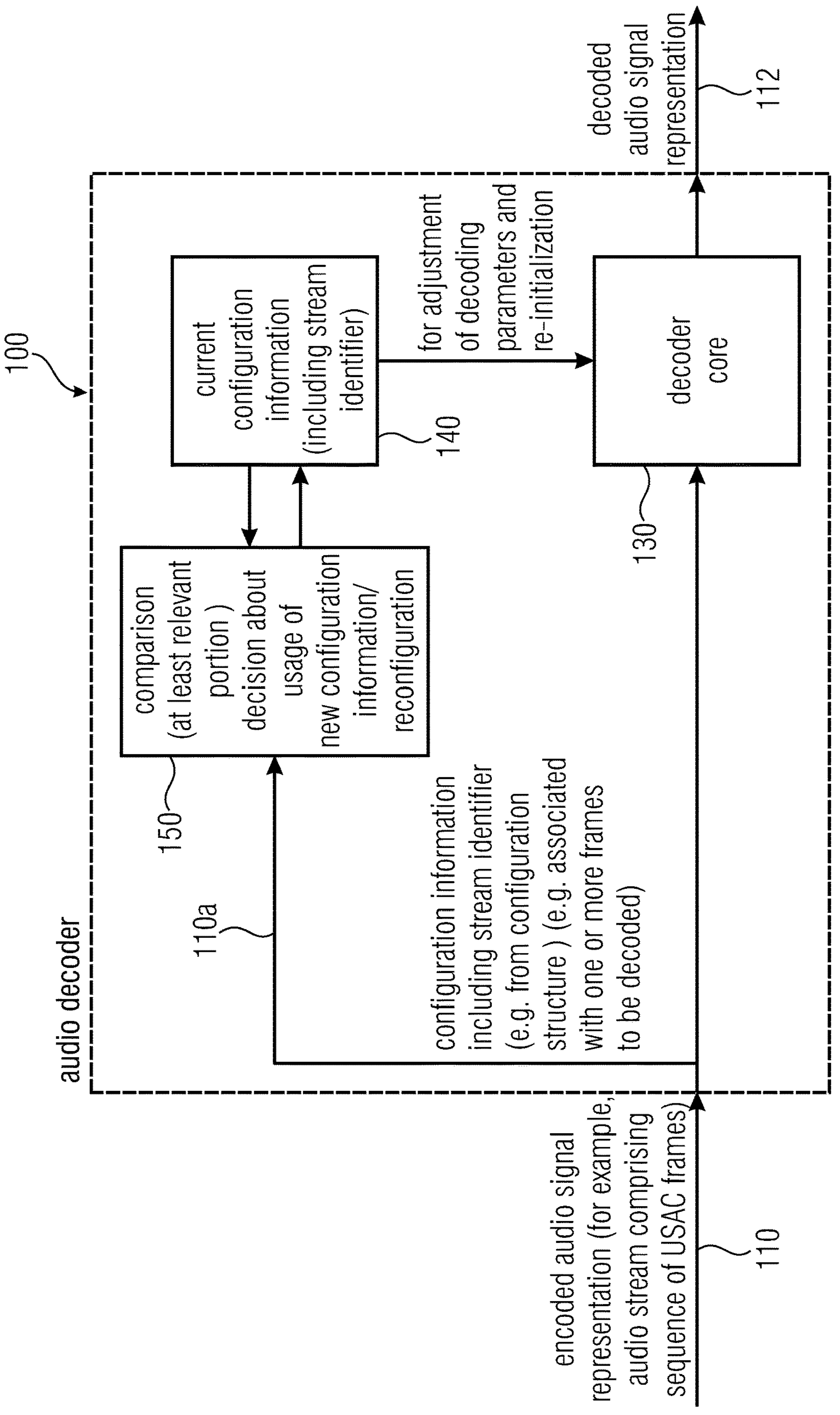
FIG. 1 shows a block schematic diagram of an audio decoder, according to a (simple) embodiment of the present invention.

FIG. 1 shows a block schematic diagram of an audio decoder, according to a (simple) embodiment of the present invention.

The audio decoder 100 receives an encoded audio signal representation 110 and provides, on the basis thereof, a decoded audio signal representation 112. For example, the encoded audio signal representation 110 may be an audio stream comprising a sequence of unified-speech-and-audio-coding (USAC) frames. However, the encoded audio signal representation can take a different form and may, for example, be an audio representation defined by a bit stream syntax of any of the known audio coding standards. The encoded audio signal representation may, for example, comprise a configuration information 110 which may, for example, be included in a configuration structure and which may, for example, comprise a stream identifier. The stream identifier may, for example, be included in the configuration information or in the configuration structure. The configuration information or configuration structure may, for example, be associated with one or more frames to be decoded and may, for example, describe decoding parameters to be used by the audio decoder.

Here, the decoder 100 may, for example, comprise a decoder core 130, which may be configured to decode one or more audio frames using a current configuration information (wherein the current configuration information may, for example, define decoding parameters). The audio decoder is also configured to adjust the decoding parameters in dependence on the configuration information 110*a*.

For example, the audio decoder is configured to compare a configuration information in a configuration structure associated with one or more frames to be decoded with a current configuration information (for example, a configuration information used for the decoding of one or more previously decoded frames). Moreover, the audio decoder may be configured to make a transition to perform a decoding using the configuration information in the configuration structure associated with the one or more frames to be decoded as a new configuration information if the configuration information in the configuration structure associated with the one or more frames to be decoded, or a relevant portion of the configuration information in the configuration structure associated with the one or more frames to be decoded, is different from the current configuration information. When making the "transition" the audio decoder may, for example, re-initialize the decoder core 130 using a random access information, which is intended to describe a state of the decoder core which should be used for properly decoding an audio frame (or a first audio frame) after the "transition".

In particular, the audio decoder is configured to consider a stream identifier, which is included in the configuration structure (i.e., within the configuration information) when comparing the configuration information (i.e., when comparing the configuration information in the configuration structure associated with the one or more frames to be decoded with the current configuration information), such that a difference between a stream identifier previously acquired by the audio decoder and the stream identifier represented by the stream identifier information in the configuration structure associated with the one or more frames to be decoded causes to make the transition.

In other words, the audio decoder may, for example, comprise a memory for the current configuration (or for the current configuration information) which may be designated with 140. The audio decoder 100 may also comprise a comparator (or any other means for performing a comparison) 150, which may compare at least a relevant portion of a current configuration information, including a stream identifier, with a corresponding portion of a configuration information associated with a next (audio) frame to be decoded including a stream identifier. The relevant portion may, for example, be a portion up to, and including, the stream identifier, wherein the configuration information which is after the stream identifier in a bit stream representing the configuration information may be neglected in some embodiments.

If this comparison, which may be performed by the comparator 150, indicates a difference between the current configuration information (or the relevant portion thereof) and the configuration information associated with the next (audio) frame to be decoded (or the relevant portion thereof), it may be recognized that a "transition" should be made.

Making the transition may, for example, comprise re-initializing the decoder core, even if the decoding parameters described by the configuration information associated with the next (audio) frame to be decoded is identical to the decoder configuration (decoding parameters) described by the current configuration information (wherein the configuration information associated with the next audio frame to be decoded only differs from the current configuration information in that the stream identifier is different). On the other hand, if the configuration information associated with the next audio frame to be decoded differs from the current configuration information even more, for example, by defining different decoding parameters, the audio decoder 100 will naturally also make a "transition" which typically means re-initializing the decoder core 130 and changing the decoding parameters.

To conclude, the audio decoder 100 according to FIG. 1 is capable of recognizing a transition between frames of different audio streams even if the decoding parameters to be used by the decoder core 130 remain unchanged by evaluating a stream identifier included in a configuration structure of an audio frame, which eliminates the need for a dedicated signaling of a transition between audio streams and/or of a condition for re-initializing the decoder core. Thus, a decoder 100 can properly decode audio frames even if there is a transition from one stream to another stream, because the audio decoder can recognize such a transition and handle it appropriately, for example by re-initializing the audio decoder and re-configuring the audio decoder with new configuration parameters (if need be).

It should be noted that the audio decoder 100 according to FIG. 1 can optionally be supplemented by any of the features and functionalities and details described herein, either individually or in combination.

2. Audio Decoder According to FIGS. 2*a* and 2*b*

Figure 2A:
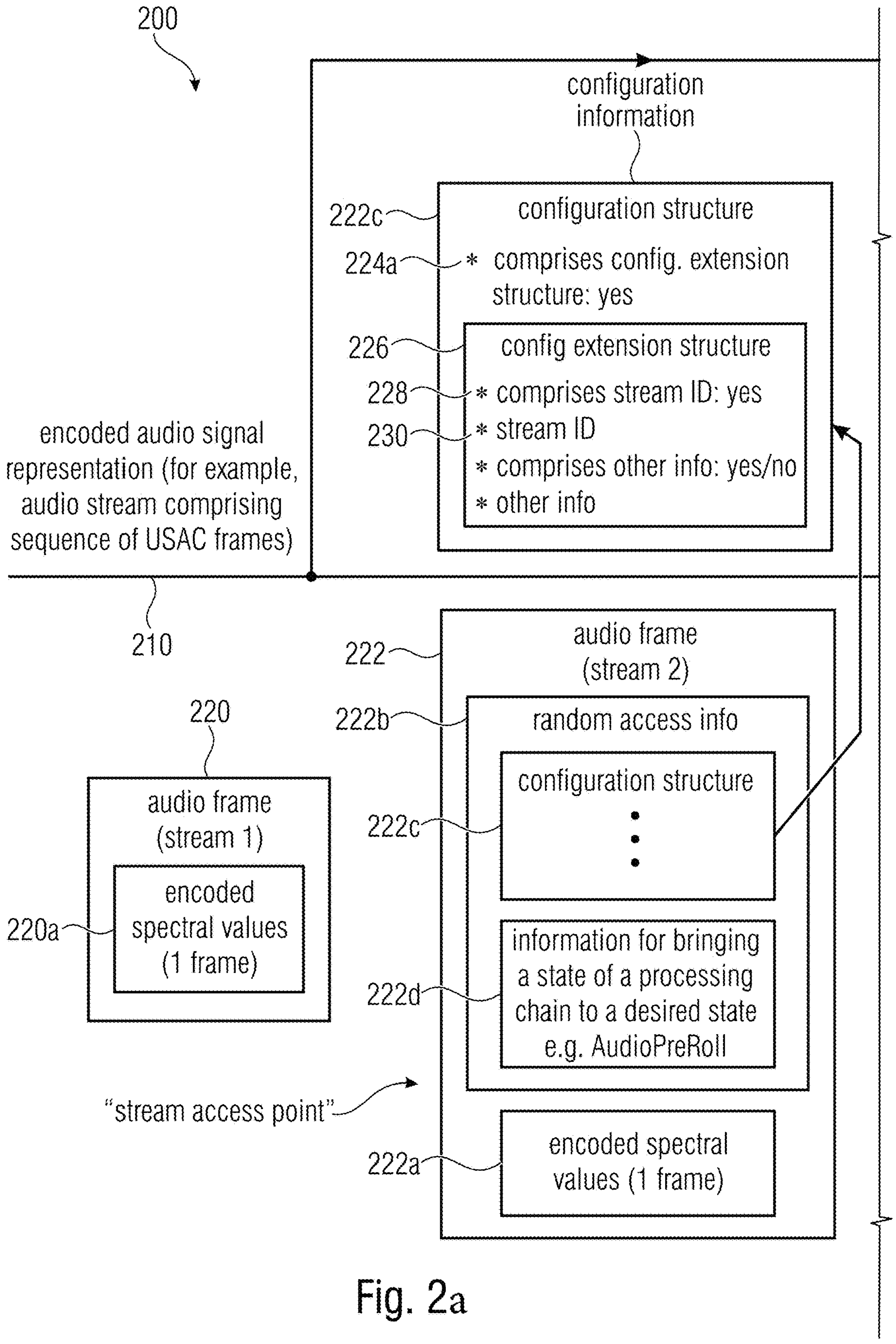
FIGS. 2*a* and 2*b* show a block schematic diagram of an audio decoder, according to an embodiment of the present invention.

FIGS. 2*a* and 22 show a block schematic diagram of an audio decoder 200 according to an embodiment of the present invention.

The audio decoder 200 is configured to receive an encoded audio signal representation 210 and to provide, on the basis thereof, a decoded audio signal representation 212. The encoded audio signal representation 210 may, for example, be an audio stream comprising a sequence of unified-speech-and-audio-coding (USAC) frames. However, a sequence of audio frames encoded using a different audio coding concept may also be input into the audio decoder 200. For example, the audio decoder may receive an audio frame 220 of a first stream and may subsequently (as a next audio frame) receive an audio frame 222 of a second stream. The audio frames 220, 222 may, for example, be provided by an audio stream provider. The audio frame 220 may, for example, comprise an encoded representation 220*a* of an audio signal, for example, in the form of encoded spectral values and encoded scale factors and/or in the form of encoded spectral values and encoded linear-prediction-coding coefficients (TXC) and/or in the form of an encoded excitation and encoded linear-prediction-coding coefficients. The audio frame 222 may, for example, also comprise an encoded representation 222*a* of an audio signal, which may be in the same form as the encoded representation 220*a* of the audio signal included in the frame 220. However, in addition, the frame 222 may also comprise a random access information 222*b*, which, in turn, may comprise a configuration structure 222*c* and an information 222*d* for bringing a state of a processing chain (for example, of a decoder core) to a desired state. This information 222*d* may, for example, be designated as "AudioPreRoll".

The audio decoder 200 may, for example, extract from the encoded audio signal representation 210 the configuration structure 222*c*, which may also be considered as a configuration information. The configuration structure 222*c* may, for example, comprise an information or a flag (or a bit) indicating whether a configuration extension structure 226 is present as a part of the configuration structure. This information or flag or bit is designated with 224*a*.

The configuration extension structure 226 may, for example, comprise an information or a flag or a bit or an identifier indicating whether a stream identifier is present. The latter information, flag, bit or identifier is designated with 228. If the information or flag or bit or identifier 228 indicates the presence of a stream identifier, there is also a stream identifier 230, which may typically be part of the configuration extension structure 226.

Moreover, the configuration extension structure may comprise an information whether there is other information, like an appropriate bit or flag or identifier, and may also comprise the other information (if applicable).

The audio decoder 100 may, for example, comprise a memory 240, which may save a current configuration information (for example, a configuration information used for the decoding of a previous frame and extracted from a configuration structure of the previous frame or of a preceding frame). The audio decoder 200 also comprises a comparator or comparison 250, which is configured to compare the configuration information associated to the audio frame to be decoded with the current configuration information which is stored in the memory 240. For example, the comparator or comparison 250 may be configured to compare the configuration information of the configuration structure 222*c* of the audio frame to be decoded with the current configuration information stored in the memory up to and including the stream identifier. In other words, any information items of the configuration structure 222*c* up to an including the stream identifier may be compared with the current configuration information from the memory 240 to determine whether the configuration information (up to and including the stream identifier) in the frame 222 is identical with the current configuration information extracted from one of the preceding audio frames. In this comparison, it will naturally be checked whether the configuration structure 222*c* actually comprises the configuration extension structure 226 and the stream identifier 230. If the configuration extension structure 226 is not present, it can naturally not be considered in the comparison. Also, if the stream identifier 230 is not present (for example, because a flag 228 indicates that it is not included in the frame 222), then it will naturally not be evaluated in the comparison. Also, any configuration information which is after the stream identifier 230 in the configuration structure 222*c* will typically be neglected in the comparison because it is assumed that such configuration information is of sub-ordinate importance and that the change of such configuration information, which is after the stream identifier 230 in the configuration structure 222*c*, does not signal a switching between different streams but can even occur within a single stream.

To conclude, the comparison 250 typically compares configuration information, up to and including a stream identifier (but advantageously omitting configuration which is arranged in the configuration extension structure after the stream identifier) of an audio frame to be decoded with the current configuration information (obtained from a previously decoded audio frame. Accordingly, the comparison 250 detects a new stream (or a sub-stream) if there is a difference in the configuration information found in the comparison. Accordingly, the comparison is used to control a transition from the first stream (or substream) to a second stream (or substream).

For example, effecting such a transition may comprise flushing a decoding of a last frame of the first stream, a reconfiguration, an initialization of a state of a processing chain to a desired state, and the execution of a cross fading, for example, between a time domain representation of a last frame of the first stream and a first frame of the second stream.

The audio decoder 200 also comprises a decoder core 216 which may be configured to decode frames of a first stream (or of a first sequence of frames) using a first configuration (which may be described by the current configuration information). Moreover, a decoder core 216 may be configured to decode a second stream or a second sequence of frames using a second configuration (for example, using a new configuration, which is described by the configuration information 222*c* of the audio frame to be decoded). For example, a re-initialization of the decoder core may be triggered when the comparison 250 finds a difference between a significant portion of the configuration information 222*c* of the audio frame 222 to be decoded and the current configuration information in the memory 240.

For example, a re-initialization of the decoder may be used between the decoding of the last frame of the first stream and the first frame of the second stream. Alternatively, a "new instance" of the decoder may be used, for example, if the decoder is implemented (at least partially) in software. Moreover, when switching from the decoding of the first stream to the decoding of the second stream ("transition"), a state of the processing chain of the decoder core may be brought to a desired state using some side information. For example, a context state of an arithmetic decoding may be brought to a desired state or a content of a time discrete filter may be brought to a desired state. This may be done using dedicated information, which is also designated as "audio pre-roll" APR. Bringing the state of the processing chain to a desired state is important, since the first frame of the second stream processed (decoded) by the audio decoder may not be the actual first frame of the second audio stream. Rather, the first frame of the second audio stream processed by the audio decoder may be some frame during the second audio stream when an audio stream provider switches from a provision of frames from a first audio stream to a provision of frames from the second audio stream. Thus, the "first frame of the second audio stream" processed by the audio decoder may rely on a specific setting of states of a decoding chain, which would normally be caused by the decoding of preceding frames of the second audio stream (preceding the audio frame to be decoded, which is the first audio frame of the second audio stream handled by the audio decoder after the transition). Thus, when switching from the decoding of audio frames of the first audio stream to the decoding of audio frames of the second audio stream, the missing setting of states of the audio decoder, which would normally be effected by a decoding of preceding frames of the second audio stream, is now made by using the "audio pre-roll" information, which defines an appropriate setting of states of the audio decoding.

As can be seen at reference numeral 270, the decoding of the last frame of the first audio stream provides a decoded portion 272 (also designated as "useful portion"). Optionally, the decoding of the last frame of the first audio stream may provide an even longer decoded portion, which is partially discarded. Moreover, when decoding the first frame of the second audio stream, there is a provision of a "pre-roll portion" 274, during which decoder states are initialized for appropriately decoding of the first frame of the second audio stream. Moreover, the decoder core 260 also provides a useful portion 276 of the first frame of the second audio stream handled by the decoder 200, wherein a useful portion 276 of the first frame of the second audio stream temporally overlaps with the useful portion 272 of the last frame of the first stream. Accordingly, a cross-fading can optionally be performed between an end of the useful portion 272 of the last frame of the first stream and a beginning of the useful portion of the first frame of the second stream. Accordingly, the decoded output signal 212 can be derived, wherein an artifact-free transition in between the last frame of the first stream (processed by the audio decoder 200) and the first frame of the second stream (processed by the audio decoder 200) is provided.

To summarize, the audio decoder 200 can recognize when an audio encoder or an audio stream provider switches from a provision of audio frame of a first stream to a provision of audio frames of a second stream. For this purpose, the audio decoder evaluates the configuration information 222*c* (also designated as configuration structure) and performs a comparison with a current configuration information stored in a memory 240. When recognizing that an audio frame to be decoded belongs to a different audio stream when compared to previously decoded audio frames, a re-initialization of the decoder core is performed, which typically includes bringing the state of the processing chain of the decoder core to a desired state by evaluating some "audio pre-roll" information. Accordingly, the audio decoder can properly handle situations in which an audio encoder, or an audio stream provider, provides an audio frame from a new stream (second audio stream) without further notice (except for the provision of the configuration structure 222*c* including the stream identifier 230).

It should be noted that the audio decoder 200 described here can be supplemented by any of the features and functionalities and details described herein, either individually or in combination.

3. Audio Encoder According to FIG. 3

Figure 3:
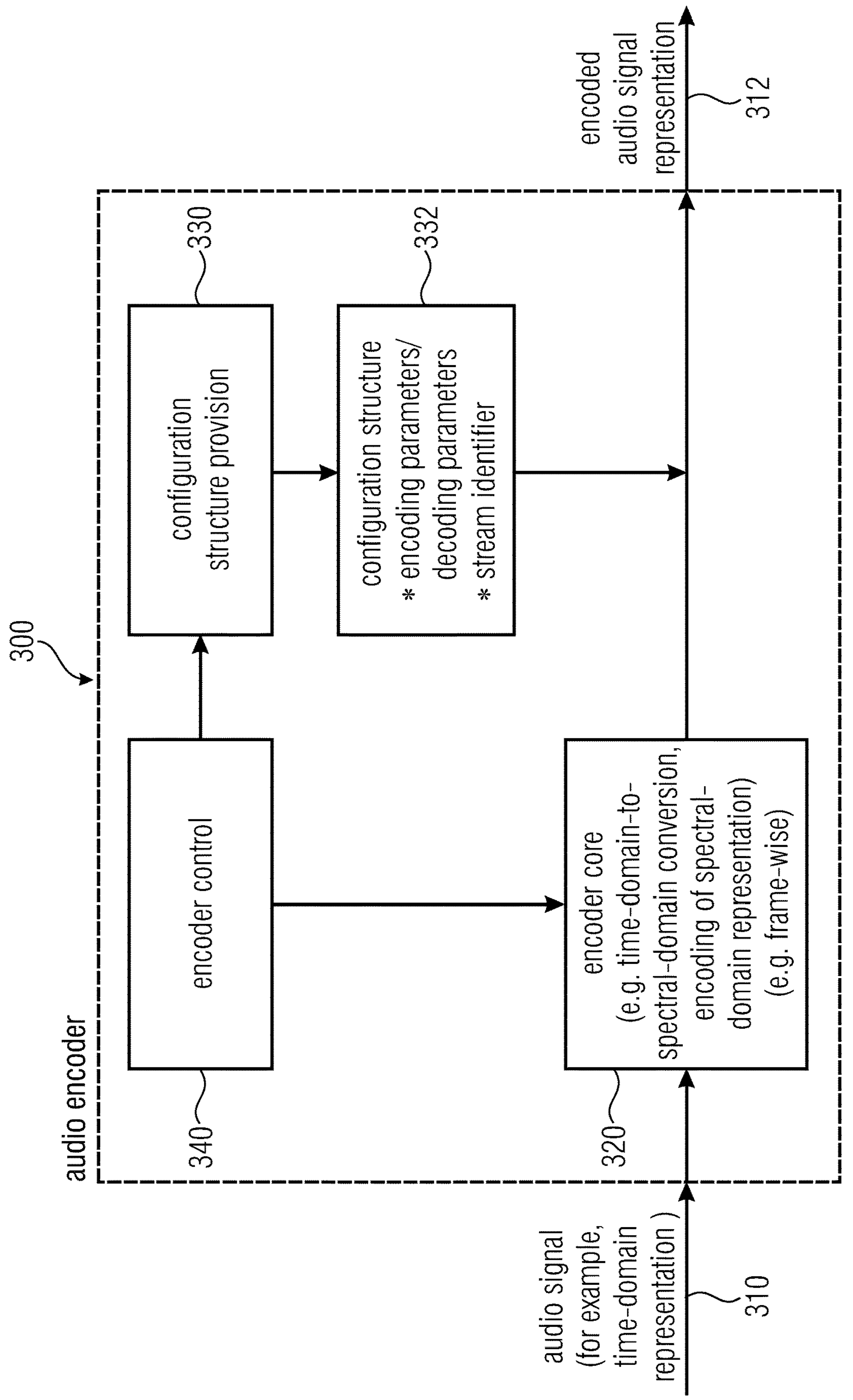
FIG. 3 shows a block schematic diagram of an audio encoder according to a (simple) embodiment of the present invention.

FIG. 3 shows a block schematic diagram of an audio encoder, according to an embodiment of the invention.

The audio encoder 300 receives an input audio signal 310 (for example, in the form of a time domain representation) and provides, on the basis thereof, an encoded audio signal representation 312. The audio encoder 300 comprises an encoder core 320, which is configured to encode overlapping or non-overlapping frames of the input audio signal 310 using encoding parameters, to obtain an encoded audio signal representation. The audio encoder 320 may, for example, comprise a time-domain-to-spectral-domain conversion and an encoding of the spectral-domain representation. The processing may, for example, be performed in a frame-wise manner.

Moreover, the audio encoder may, for example, comprise a configuration structure provision 330, which is configured to provide a configuration structure 332 describing the encoding parameters (or, equivalently, decoding parameters to be used by an audio decoder). The configuration structure 332 may, for example, correspond to the configuration structure 222*c*. In particular, the configuration structure 332 may comprise encoding parameters (for example, in an encoded form) or, equivalently, decoding parameters (for example, in an encoded form) which describe a setting to be used by a decoder (or decoder core) when decoding the encoded audio signal representation 312. An example of a configuration structure 332 will be described below. Moreover, the configuration structure 332 comprises a stream identifier, which may correspond to the stream identifier 230. For example, the stream identifier may designate an audio stream (for example, a contiguous piece of audio content which is encoded in a contiguous manner using a specific encoder setting). For example, the stream identifiers provided by the configuration structure provision 330 may be chosen such that all those audio streams between which there should be the possibility to switch without artifacts, and without explicitly notifying the audio decoder about the switching, should carry different stream identifiers. However, in some cases, it may be sufficient if such streams having associated identical encoding parameters (or, equivalently, decoding parameters to be used by an audio decoder) comprise different stream identifiers. In other words, different stream identifiers may only be used for such streams for which the other encoding parameters or decoding parameters are identical.

Accordingly, an encoder control 340 may, for example, control both the encoder core 320 and the configuration structure provision 330. The encoder control 340 may, for example, decide about the encoding parameters to be used by the encoder core 320 (which may, for example, at least partially correspond with decoding parameters to be used by an audio decoder) and may also inform the configuration structure provision 330 about the encoding parameters/decoding parameters to be included in the configuration structure 332. Accordingly, the encoded audio representation 312 comprises the encoded audio content and also the configuration structure 332. Accordingly, an audio decoder (for example, the audio decoder 100 or the audio decoder 200) can instantly recognize when a different audio stream, encoded using different encoding parameters, is provided (even if not all encoding parameters are reflected by the decoding parameters included in the configuration structure).

Regarding this issue, it should be noted that it is typically not necessary to signal all encoding parameters to an audio decoder. For example, it is only necessary to signal those encoding parameters to an audio decoder which affect the decoding algorithm. The encoding parameters which are sent to the audio decoder in order to determine a setting of the audio decoder are also designated as decoding parameters. On the other hand, some important encoding parameters are typically not signaled to an audio decoder, but are rather reflected implicitly in the encoded audio signal representation. For example, the desired bit rate may be an important encoding parameter and may decide how coarsely an audio encoder quantizes spectral values and/or how many spectral values an audio quantizes to a small value or even to a zero value. However, for the audio decoder, it is sufficient to see the result of the encoding, but he will not need to know the specific strategy of the encoder how to keep the bit rate reasonably small. Also, there may be different approaches at the side of the encoder to achieve a sufficiently small bit rate, depending on the type of audio content and also depending on the actual desired bit rate. These parameters may be considered as "encoding parameters" but they will not be reflected in a set of "decoding parameters" (and will not be included into the encoded representation of the audio frames), wherein the decoding parameters (and these encoding parameters which are incorporated into the encoded audio representation) typically only describe which setting a decoder should use, i.e., how it should handle the encoded information provided by the encoder.

Accordingly, it might actually be the case that the decoding parameters, which may be included in the configuration structure 332, may be identical, even though the encoder core uses different encoding parameters (for example, in terms of a target bit rate, or in terms of parameters affecting the target bit rate, like a quantization resolution or a psychoacoustic model involved).

In other words, the audio encoder may, for example, be able to encode a given audio content using different encoding parameters, even though the decoding parameters to be used by the decoder (in order to process and decode the encoded representation of the audio content) may be identical.

In such cases, the audio encoder may provide different stream identifiers within the configuration structure 332, such that an audio decoder can still distinguish such different encoded representations of an audio content.

Moreover, it should be noted that the audio encoder 300, according to FIG. 3, can optionally be supplemented by any of the features, functionalities and details described herein.

4. Audio Stream Provider According to FIG. 4

Figure 4:
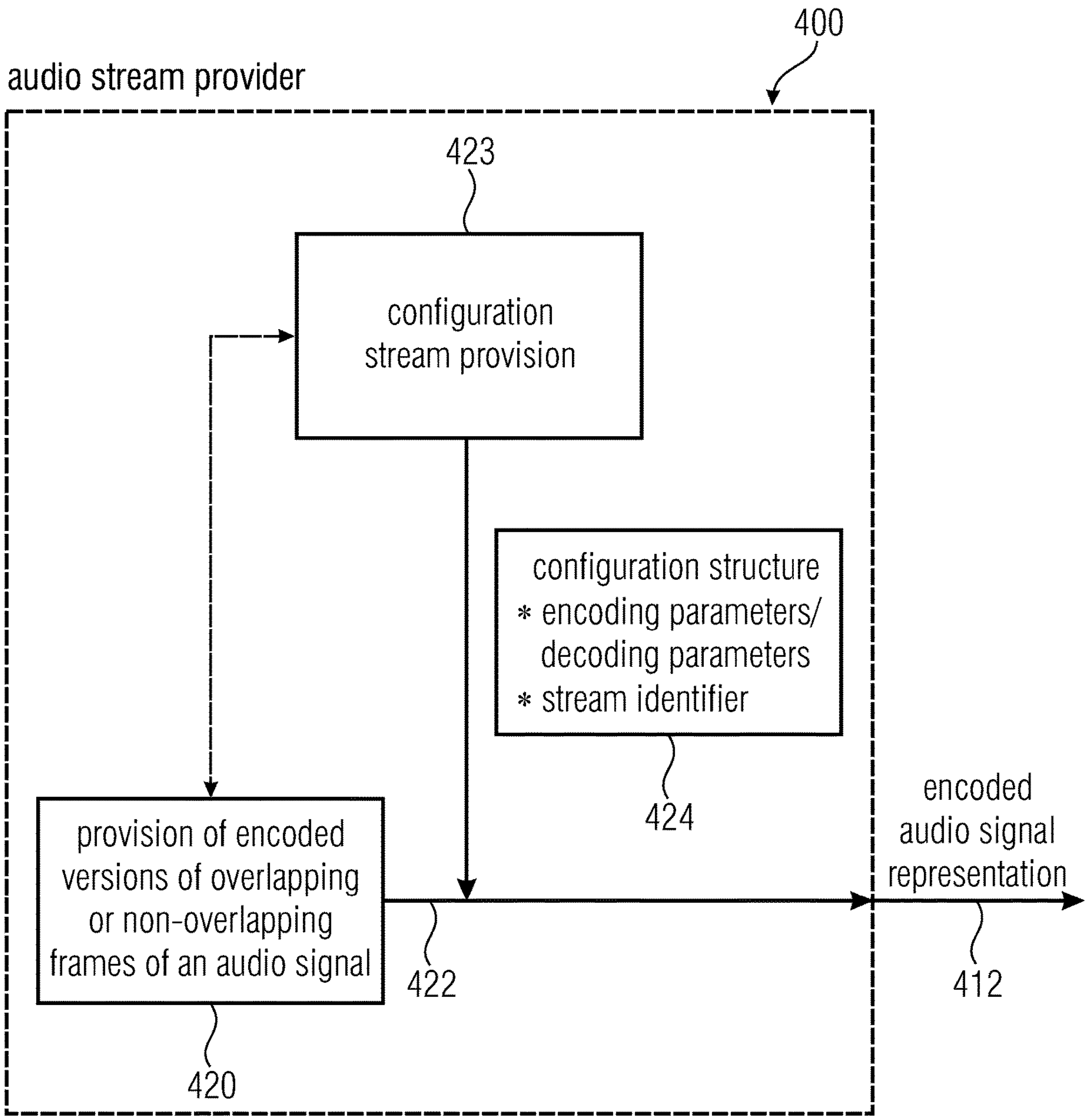
FIG. 4 shows a block schematic diagram of an audio stream provider according to a (simple) embodiment of the present invention.

FIG. 4 shows a block schematic diagram of an audio stream provider, according to an embodiment of the present invention.

The audio stream provider 400 is configured to provide an encoded audio signal representation 412. The audio stream provider is configured to provide encoded versions 422 of (temporally) overlapping or non-overlapping frames of an audio signal, encoded using encoding parameters, as a part of the encoded audio signal representation 412.

Moreover, the audio stream provider is configured to provide a configuration structure 424 describing the encoding parameters (or, equivalently, decoding parameters to be used by an audio decoder) as a part of the encoded audio signal representation, wherein the configuration structure 424 comprises a stream identifier.

For example, the audio stream provider may comprise a provision (or provider) of the encoded versions of overlapping or non-overlapping frames of the audio signal. Moreover, the audio stream provider may also comprise a configuration structure provision or configuration structure provider 423 for providing the configuration structure 424.

Accordingly, the audio stream provider may provide, as a part of the encoded audio signal representation 412, portions of different audio streams, which the audio stream provider may, for example, store in a memory or receive from an audio encoder. When providing a portion of a first audio stream and then switching to a provision of a portion of a second audio stream, a configuration structure 424 may be associated with the first audio frame of the second audio stream which is provided after the switching from the first audio stream to the second audio stream. The configuration structure 424 may, for example, be part of the respective audio streams which are received by the audio stream provider from an audio encoder or which are stored in a memory of the audio stream provider. Thus, the audio stream provider may, for example, store a contiguous sequence of audio frames of a first audio stream and also store a contiguous sequence of audio frames of a second audio stream. At least some of the frames of the first audio stream and some of the frames of the second audio stream may have associated respective configuration structures, which describe decoding parameters to be used by an audio decoder. The configuration structures may also comprise respective stream identifiers, for example, integer numbers identifying an audio stream. For example, the audio stream provider may be configured to provide frames 1 to n−1 (wheren 1 to n−1 may be time indices) for a first audio frame and frames n to n+x (wheren n to n+x may be time indices) of a second audio stream as a part of the encoded audio signal representation 412, wherein frames 1 to n−1 of the second audio stream may not be provided as part of the encoded audio signal representation 412 which is directed to a specific audio decoder or to a specific group of audio decoders. The first audio stream and the second audio stream may, for example, represent identical content encoded with different bit rate. Accordingly, frames 1 to n−1 of the audio content is represented, in the encoded audio signal representation 412 directed to a certain device or group of devices, by the first audio stream, encoded at a first bit rate, and frames n to n+x of the audio content are represented by frames n to n+x of the second audio stream, which is encoded at a second bit rate different from the first bit rate.

For example, the audio stream provider 400, or some external control, may ensure that the first frame n of the second audio stream, which is included in the encoded audio signal representation 412, comprises a configuration structure. In other words, it may, for example, be ensured that the switching between the provision of audio frames from the first audio stream and the provision of audio frames from the second audio stream only takes place at an "appropriate"

frame, which comprises a configuration structure and which advantageously also comprises some information for initializing an audio decoder (like, for example, an audio pre-roll).

Thus, the audio stream provider may, for example, provide some portions of an audio content encoded at a first bit rate (for example, by providing frames 1 to n−1 of the first audio stream) and other portions of the audio stream encoded using a second bit rate (for example, by providing audio frames n to n+x of the second audio stream). Possibly the configuration structures of the first audio stream and of the second audio stream will be identical except for the fact that the stream identifier is different. This is due to the fact that the decoding parameters reflected in the configuration structure 424 do not necessarily need to reflect the different encoding parameters (or all of the encoding parameters) used for the encoding of the first audio stream and for the encoding of the second audio stream, such that it is actually (only) the stream identifier, which is also included in the configuration structure, which allows an audio decoder to determine whether a "transition" should be made (for example, by re-initializing a decoder core).

A decision whether to provide audio frames from the first audio stream or from the second audio stream may, in some embodiments, be made by the audio stream provider (for example, on the basis of an knowledge of the network conditions made, for example, a network load or an available network bit rate of a network between the audio stream provider and an audio decoder). Alternatively, however, an audio decoder, or an intermediate device (for example, a network management device) may decide which audio stream should be used.

However, it should be noted that the audio decoder, or at least the audio decoder core, may not be explicitly informed by the audio stream provider and/or by the intermediate network that a change of the stream has occurred. In other words, the audio decoder does not receive any additional information, except for the configuration structure 424, signaling to the audio decoder that frames n to n+x are from the second audio stream, while frames 1 to n−1 are from the first audio stream.

To conclude, the audio stream provider can flexibly provide an encoded representation of an audio content to an audio decoder in the form of an encoded audio signal representation. The audio stream provider can, for example, flexibly switch between a provision of encoded frames from a first audio stream and coded frames from a second audio stream, wherein a switching between audio streams is signaled by a change of the stream identifier which is included in the configuration structure 424, which is part of the encoded audio signal representation 412.

It should be noted here that the audio stream provider 400 can optionally be supplemented by any of the features, functionalities and details described herein.

In the following, an example of the functionality of the audio stream provider 400 will be described taking reference to FIG. 5 which shows a block schematic diagram of an audio stream provider according to the embodiment of the invention.

Figure 5:
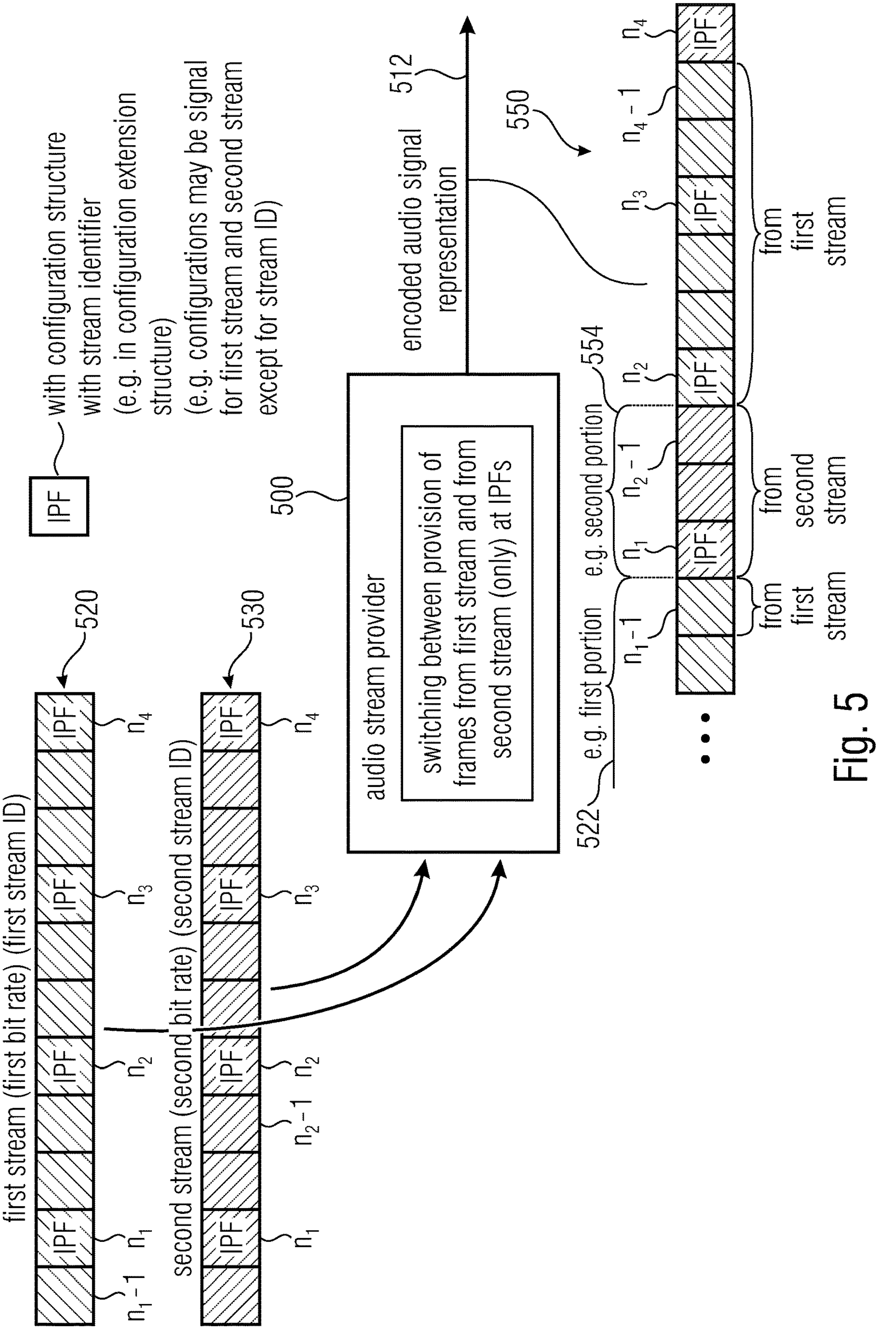
FIG. 5 shows a block schematic diagram of an audio stream provider according to an embodiment of the present invention.

The audio stream provider shown in FIG. 5 is designated with 500 and may correspond to the audio stream provider 400 according to FIG. 4. The audio stream provider 500 is configured to provide an encoded audio signal representation 512, which may correspond to the encoded audio signal representation 412.

In particular, the audio stream provider may be configured to switch between a provision of frames from a first audio stream and from a second audio stream. For example, the audio stream provider 500 may be configured to switch between a provision of frames from the first audio stream and from the second audio stream only at so-called "independent-playout-frames" (also designated to "IPFs").

The audio stream provider 500 may have stored in a memory, or may receive from an audio encoder, a first audio stream 520 and a second audio stream 530. The first audio stream may, for example, be encoded at a first bit rate and may comprise, in configuration structures (for example, of immediate playout frames), a first stream identifier. The second audio stream 530 may be encoded at a second bit rate and may comprise, in configuration structures (for example, of immediate playout frames), a second stream identifier. However, the first audio stream and the second audio stream may, for example, represent a same audio content. However, the first audio stream and the second audio stream could also represent different audio contents.

For example, the first audio stream 520 may comprise independent-playout-frames at frames indicated $n_1$, $n_2$, $n_3$ and $n_4$. For example, one or more "normal" audio frames, which are not independent playout frames, may be arranged between two adjacent independent playout frames. However, independent playout frames could also be adjacent in some situations.

Similarly, the second audio stream 530 also comprises independent playout frames at frame positions $n_1$, $n_2$, $n_3$ and $n_4$.

It should be noted that positions of independent playout frames in the two streams 520, 530 may optionally be identical but could also be different. For the sake of simplicity, it is assumed here that the frame positions of the independent playout frames are identical in both streams.

However, in principle, it is only important that the first frame after the switching is an independent playout frame. For example, when switching from a provision of audio frames of the first audio stream to a provision of audio frames from the second audio stream, it should be ensured, by the audio stream provider 500, that a first frame of a portion of frames provided from the second audio stream is an independent playout frame.

An example will be described with reference to an encoded audio signal representation shown at reference numeral 550. As can be seen, the encoded audio signal representation 512 comprises, at its beginning, a portion 552 which comprises one or more frames of a first audio stream. However, after the provision of an audio frame having index $n_1-1$ of the first audio stream, the audio stream provider 500 may decide (on the basis of an internal decision, or on the basis of some control information received externally) to switch to the second audio stream. Accordingly, a portion 554 of audio frames of the second audio stream is provided within the encoded audio signal representation 512. For example, frames having frame indices from $n_1$ to $n_2-1$ of the second audio stream are provided in the portion 554 within the encoded audio signal representation 512. It should be noted that the first frame of the portion 554 is an independent playout frame, which is at frame index $n_1$ within the second audio stream 530. However, when a frame having frame index $n_2-1$ has been provided within the encoded audio signal representation 512, the audio stream provider may again decide to return to the provision of audio frames from the first audio stream 520. Accordingly, after (or directly after) the audio frame having frame index $n_2-1$ (which is based on the second audio stream 530), a frame having frame index $n_2$, which is taken from the first audio stream 520, may be provided within the encoded audio signal representation. It should be noted that the frame having index $n_2$ is also an independent playout frame. Accordingly, a portion from the first audio stream is taken starting from frame having index $n_2$ and ending at frame index $n_4-1$.

To conclude, the encoded audio signal representation 512 is a concatenation of portions of one or more frames, wherein some portions of frames are taken from the first audio stream 520 and wherein some portions of the frames are taken from the second audio stream 530. The first frame of each portion is advantageously an independent playout frame, which is advantageously ensured by the operation of the audio stream provider.

Such an independent playout frame advantageously comprises a configuration structure with a stream identifier, wherein the stream identifier may, for example, be contained in a configuration extension structure. For example, the configuration information of the first stream and of the second stream may be identical except for the stream identifier (and, possibly, except for configuration information which is contained within the configuration extension structure after the stream identifier).

For example, the independent playout frames may correspond to the frame 220 as explained above with respect to the audio decoder 200.

To further conclude, the audio stream provider 500 may be able to have access to a plurality of audio streams (for example, the first audio stream 520 and the second audio stream 530 and, optionally, further audio streams) and may select portions of frames from these two or more audio streams for inclusion into the encoded audio signal representation 512, which is forwarded (for example, via communication network) to an audio decoder. When selecting the portions of frames to be included into the encoded audio signal representation 512, the audio stream provider may ensure that the first frame of each portion is an independent playout frame which comprises sufficient information for (artifact-free) rendering without having decoded any previous frames of said audio stream. Moreover, the audio stream provider provides the encoded audio signal representation in such a manner that a switching between portions of audio frames from different streams is recognizable for an audio decoder receiving the encoded audio signal representation 512 from a difference within the relevant portion of the configuration structure. For some transitions, the configuration structures may differ with respect to decoder configuration parameters, but for one or more other transitions, the configuration structures may only differ in the stream identifier, while the other decoding configuration parameters may be identical.

Consequently, audio decoders can recognize a switching between different audio streams and perform a re-initialization ("transition") whenever it is appropriate.

5. Audio Frame According to FIG. 6

Figure 6:
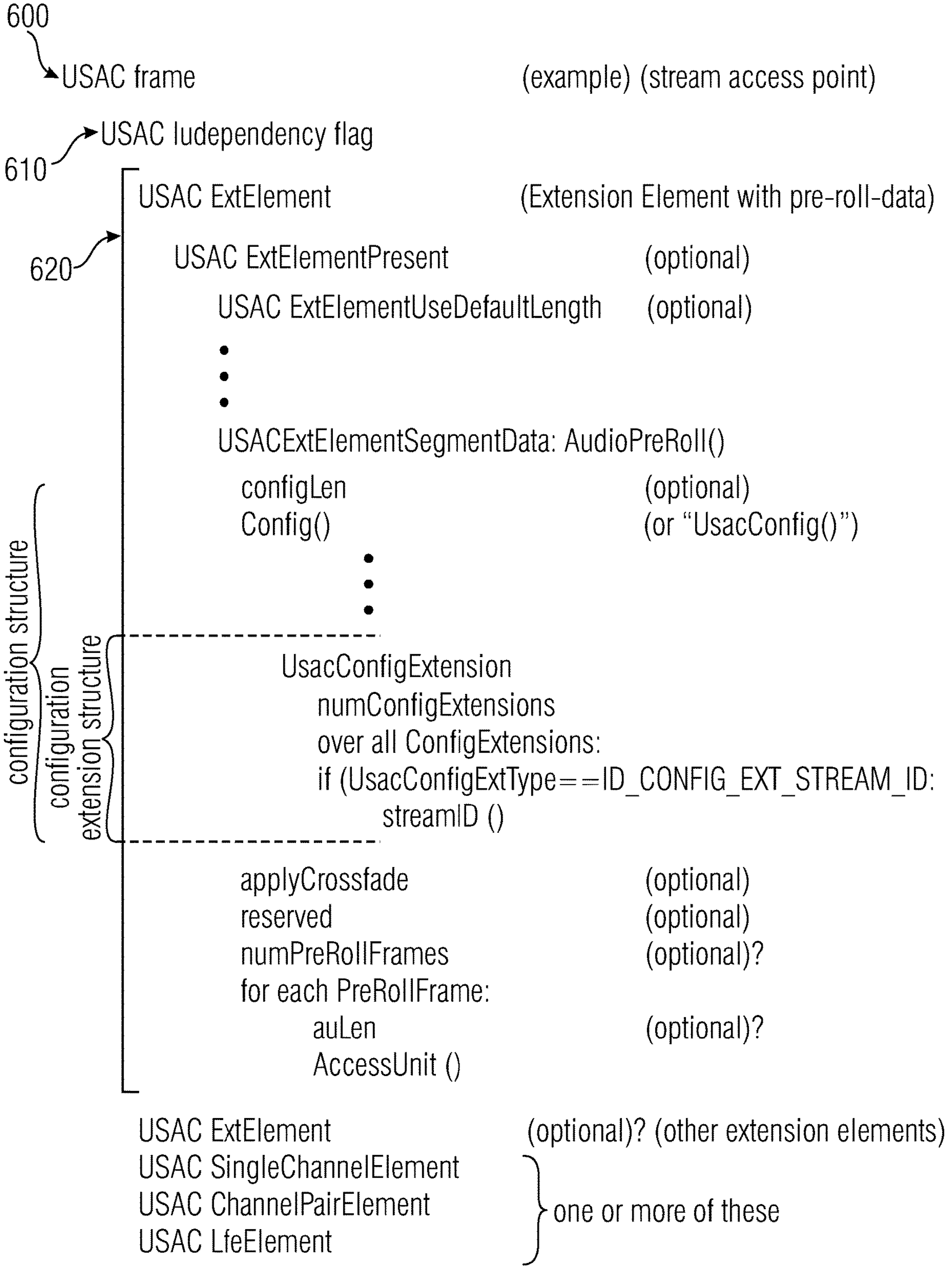
FIG. 6 shows a representation of an audio frame allowing a random access and comprising a configuration portion with a stream identifier in a configuration extension portion, according to an embodiment of the present invention.

FIG. 6 shows a representation of an audio frame allowing for a random access and comprising a configuration portion with a stream identifier in a configuration extension portion.

Figure 2B:
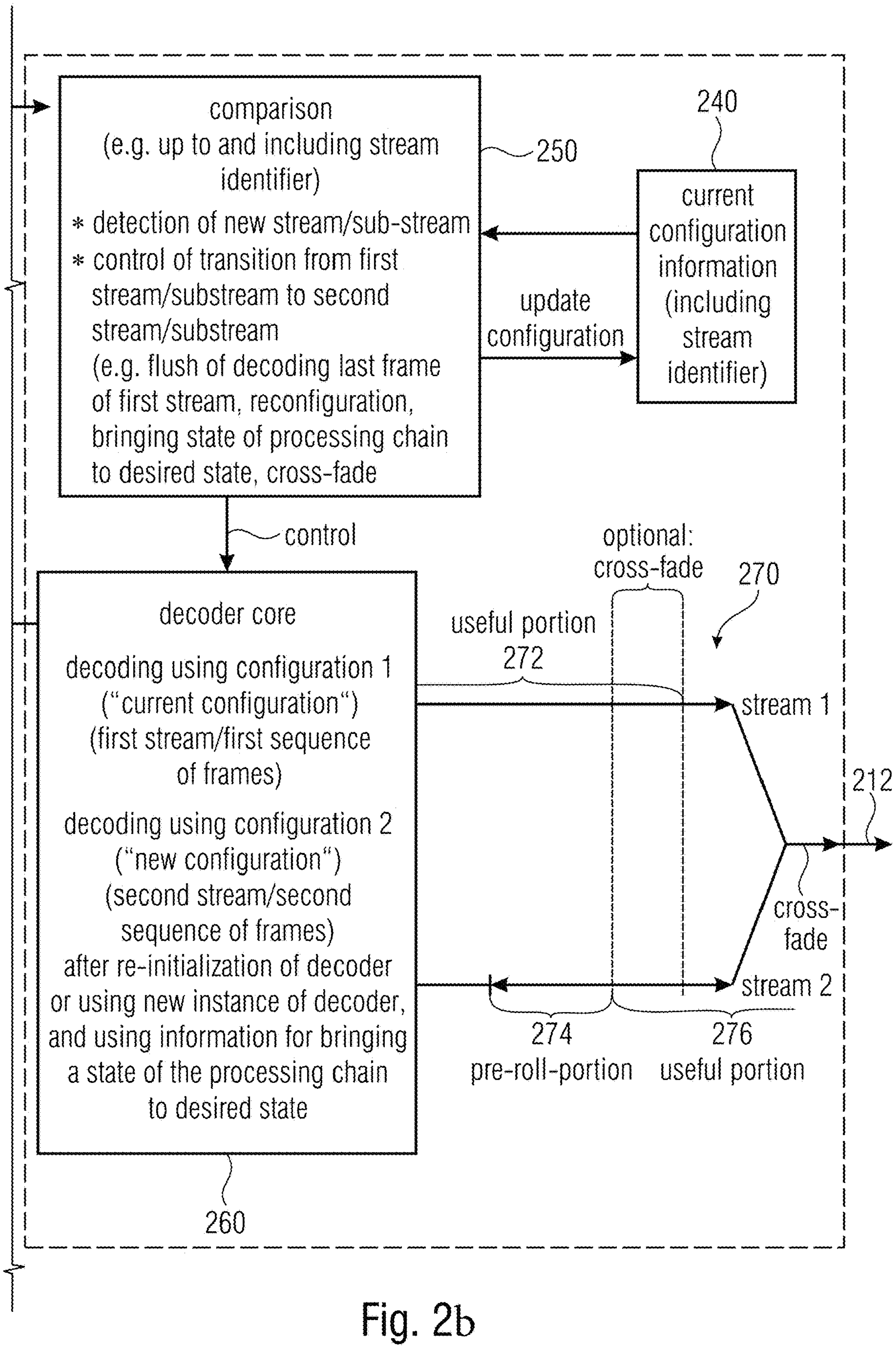

For example, FIG. 6 shows an example of an audio frame which could take over the role of the audio frame 222 described taking reference to FIGS. 2*a* and 2*b*. For example, the audio frame can be a "USAC frame". The audio frame of FIG. 6 may be considered as a "stream access point" or "intermediate playout frame".

The frame may, for example, follow the syntax conventions of the unified-speech-and-audio-coding standard, including the amendments available, but could also be adapted to the bitstream syntax of other or newer audio standards.

For example, the USAC frame 600 may comprise a USAC independency flag 610. Moreover, the USAC frame may comprise an extension element designated as "USAC ExtElement". The extension element 620 may be an extension element with a configuration information and with pre-roll-data.

Optionally, there may be a flag "USAC ExtElementPresent" which indicates that presence of a further data. For example, it is advantageous that this flag is 1 in the case of an IPF (for example, a stream access point). However, this flag may be considered as being optional.

Moreover, there may, optionally, be a flag "USAC ExtElementUseDefaultLength" which may be used to encode whether a default length of the extension element should be used or whether the length of the extension element is encoded. For example, it is advantageous (but not necessary) that this flag has a value of zero in the case of an IPF.

Moreover, there are extension element segment data, which are also designated as "USACExtElementSegmentData". These extension element segments data comprise an audio-pre-roll information, also designated as "AudioPreRoll( )" in an amendment of the USAC standard. The audio pre-roll optionally comprises a configuration length information "configLen" and a configuration information "Config( )", wherein the configuration information may be identical to the "USAC configuration information" which is also designated as "UsacConfig( )". Advantageously, but not necessarily, "configLen" should take a value larger than zero if the configuration information is present. For example, a zero value of "config Len" may indicate that the configuration information is not present. The configuration information may comprise some basic configuration information, like an information about a sampling frequency and an information about a SBR frame length and an information about a channel configuration and a number of other (optional) decoder configuration items. The other decoder configuration items may, for example, comprise one or more or even all of the configuration items described in the definition of the "UsacDecoderConfig( )" syntax element in the USAC standard.

Moreover, the configuration information comprises, as a sub-data structure, a configuration extension structure. The configuration extension structure may, for example, follow the syntax of the syntax element "UsacConfigExtension( )". For example, the configuration extension structure may comprise an information regarding a number of configuration extensions "numConfigExtensions". If there is a configuration extension of type ID_Config_Ext_Stream_ID, which is typically the case in embodiments according to the invention, the stream identifier is represented by a bit stream syntax element "stream Id( )", which may be represented, for example, by a 16 bit value.

To conclude, the configuration structure, which is included in a USAC frame in an extension element, comprises some configuration information for setting decoder parameters and further comprises, as a configuration extension, a stream identifier, which may be represented as an integer number of, for example, 16 bit.

The audio-pre-roll-information optionally comprises further information, like a flag "applyCrossfade" indicating whether to apply a cross fade (wherein, for example, a zero value may indicate not to apply a cross-fade), an information about a number of pre-roll frames and an information regarding the pre-roll frames, which may be designated as "auLen" and "AccessUnit( )".

The USAC frame optionally further comprises additional extension elements, and typically comprises one or more of a single channel element, a channel pair element or a lower-frequency-effect-element.

To conclude, a USAC frame (for example, the USAC frame 222 or one of the immediate-playout-frames IPF) may, for example, comprise an extension syntax element, wherein said extension syntax element comprises the configuration structure (for example, 222*c*) and information about one or more pre-roll frames, which may, for example, be used to bring a state of a processing chain to a desired state and which may, for example, correspond to the information 222*d*. Moreover, the USAC frame also comprises encoded audio information, like the single channel element, the channel pair element or the low-frequency-effects-element. Thus, it is possible for an audio decoder to recognize a change of an audio stream on the basis of the stream identifier "streamId( )". Also, it is possible for an audio decoder to perform an artifact-free decoding of the USAC frame 600, since the decoding parameters can be set on the basis of the configuration information included in the configuration structure, and since a proper state of the audio decoding can be set on the basis of the pre-roll-frame information. Thus, the USAC frame described allows to switch between a decoding of frames from a different audio stream and also allows for a detection of the switching by an audio decoder without additional control information.

The USAC frame 600 described herein can correspond to the audio frame 222 or can correspond to the first frame of a second audio stream included into the encoded audio signal representation 312 or can correspond to a first frame of the second audio stream included into the encoded signal representation 412, or can correspond to an immediate playout frame IPF as shown in FIG. 5.

6. Example Audio Stream According to FIG. 7

Figure 7:
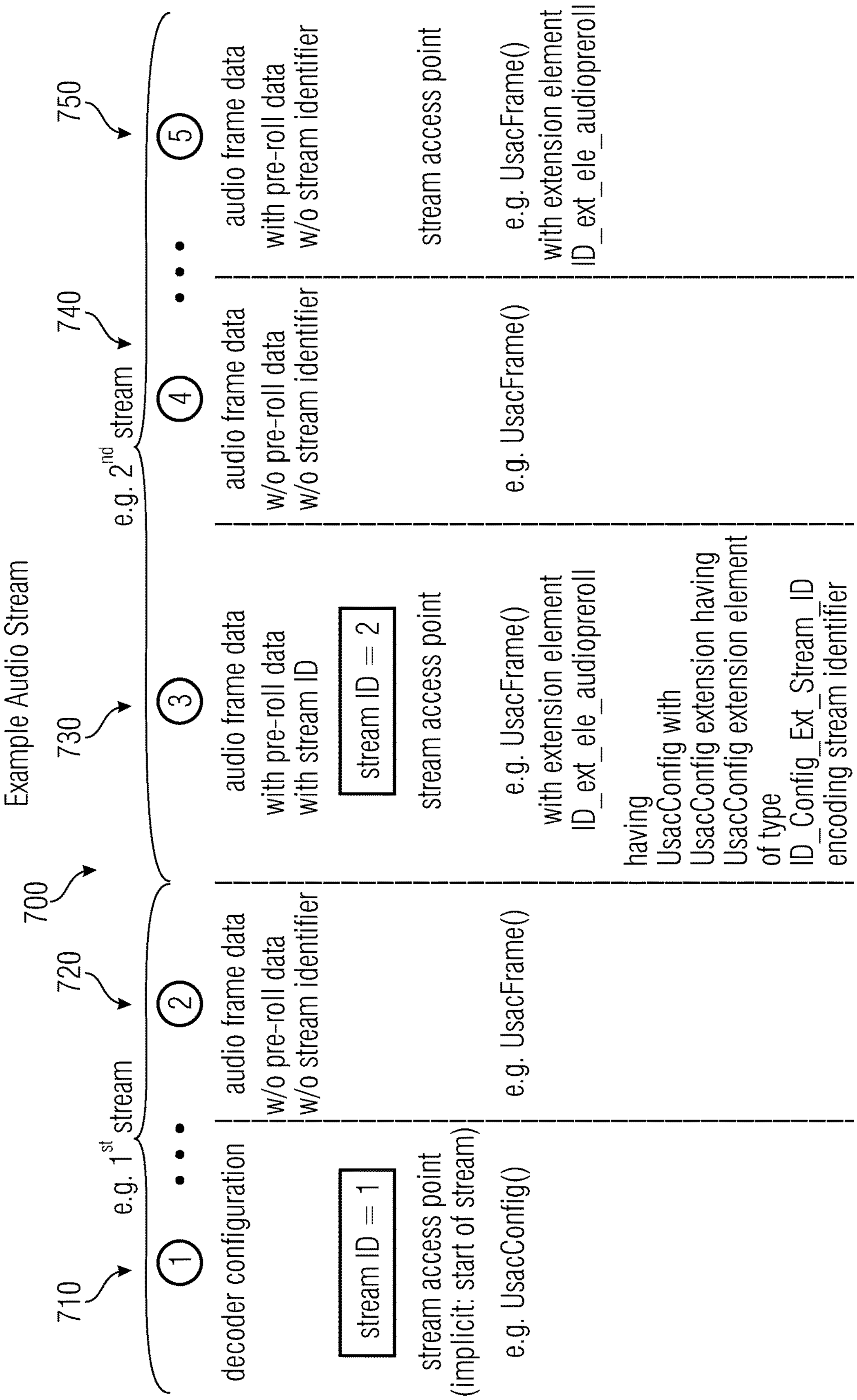
FIG. 7 shows a representation of an example audio stream, according to an embodiment of the present invention.

FIG. 7 shows a representation of an example audio stream, which can be provided by one of the audio encoders described herein and which can be decoded by one of the audio decoders described herein. The audio stream of FIG. 7 can also be provided by an audio stream provider as described herein.

The audio stream 700 comprises, for example, as a first information block, a decoder configuration information. The decoder configuration information may, for example, comprise a bit stream element "UsacConfig( )", as defined in the USAC standard. The decoder configuration information may, for example, indicate a stream identifier of one and may be considered as a stream access point which lies at the beginning of a stream.

The audio stream also comprises an audio frame data information unit 720 which may, for example, not comprise any pre-roll data and which may also not comprise any stream identifier information. For example, the information unit 720 may be a USAC frame and may, for example, correspond to the bit stream syntax element "UsacFrame( )" as defined in the USAC standard.

The information units 710 and 720 may, for example, both belong to a first audio stream.

The audio stream 700 may also comprise information unit 730, which may, for example, represent the first frame of the second stream which is included into the audio stream 700. The information unit 730 may, for example, comprise audio frame data, pre-roll data and a stream identifier information. The stream identifier information may, for example, indicate a stream identifier of two which is different from the stream identifier included in the information unit 710.

The information unit 730 may, for example, be considered as a stream access point.

For example, the information unit 730 may be according to the syntax of the bit stream element "UsacFrame( )", as defined in the USAC standard. However, the information unit 730 may comprise an extension element of type "id_ext_ele_audiopreroll". This extension element may comprise a configuration structure, for example, according to the bit stream syntax "UsacConfig" with a configuration extension structure, for example according to the bit stream syntax "UsacConfigExtension". The configuration extension structure may, for example, comprise an extension element of type "ID_CONFIG_EXT_STREAM_ID" encoding a stream identifier. Thus, information item or information unit 730 may, for example, comprise the information of the USAC frame 600 as explained above.

Thus, the information unit 730 may represent an audio frame of the second stream, and provide a full configuration information for configuring an audio decoder to properly decode the audio frame. In particular, the configuration information also comprises an audio pre-roll information for setting states of the audio decoder and the configuration information comprises a stream identifier which allows the audio decoder to recognize if information unit 730 is associated with a different audio stream when compared to the information unit 700, 710.

The audio stream 700 also comprises an information unit 740, which follows the information unit 700. The information unit 740 may, for example, be a "normal" audio frame which only comprises audio frame data, without pre-roll data, without configuration data and without a stream identifier. For example, information unit 740 may follow the bit stream syntax "UsacFrame( )" without making use of any extension elements.

The audio stream 700 may also comprise information unit 750 which may, for example, comprise audio frame data and pre-roll data, but which may not comprise a stream identifier. The information unit 750 may, therefore, but usable as a stream access point but may not allow a detection of a switching between different streams.

For example, the information unit 750 may be according to the bit stream syntax "UsacFrame( )", with an extension element ID_ext_ele_audiopreroll". However, in the information unit 750, the configuration information, which is part of the audio pre-roll extension element, does not comprise a stream identifier. Thus, the information unit 750 cannot be used reliably as a first information unit after a switching between different audio streams. On the other hand, the information unit 730 can reliably be used as a first information unit after a switching between different audio streams, since the stream identifier included therein allows for a detection of a switching between different streams and since the information unit also comprises full information for decoding, including configuration information and pre-roll information.

To conclude, the audio stream 700 may comprise "information units" or encoded audio frames having different information content. There may be "very simple" audio frames which only comprise encoded audio data, without configuration data and without pre-roll data. Also, there may be audio frames which comprise encoded audio information, as well as configuration information, which also includes a stream identifier, and pre-roll information. Such frames allows for identification of a switching between different audio streams and for a full independent decoding.

Moreover, there may also, optionally, be frames which only have a partial information but which, for example, do not allow for a reliable identification of a switching between different streams because there is no stream identifier information.

It should be noted that the audio decoders according FIGS. 1 and 2 can typically make use of the audio stream 700 and that the audio encoders and audio stream providers according to FIGS. 3 and 4 can typically provide the audio stream 700 as shown in FIG. 7 (for example, as the encoded audio signal representation 312, 314).

7. Audio Stream According to FIG. 8

Figure 8:
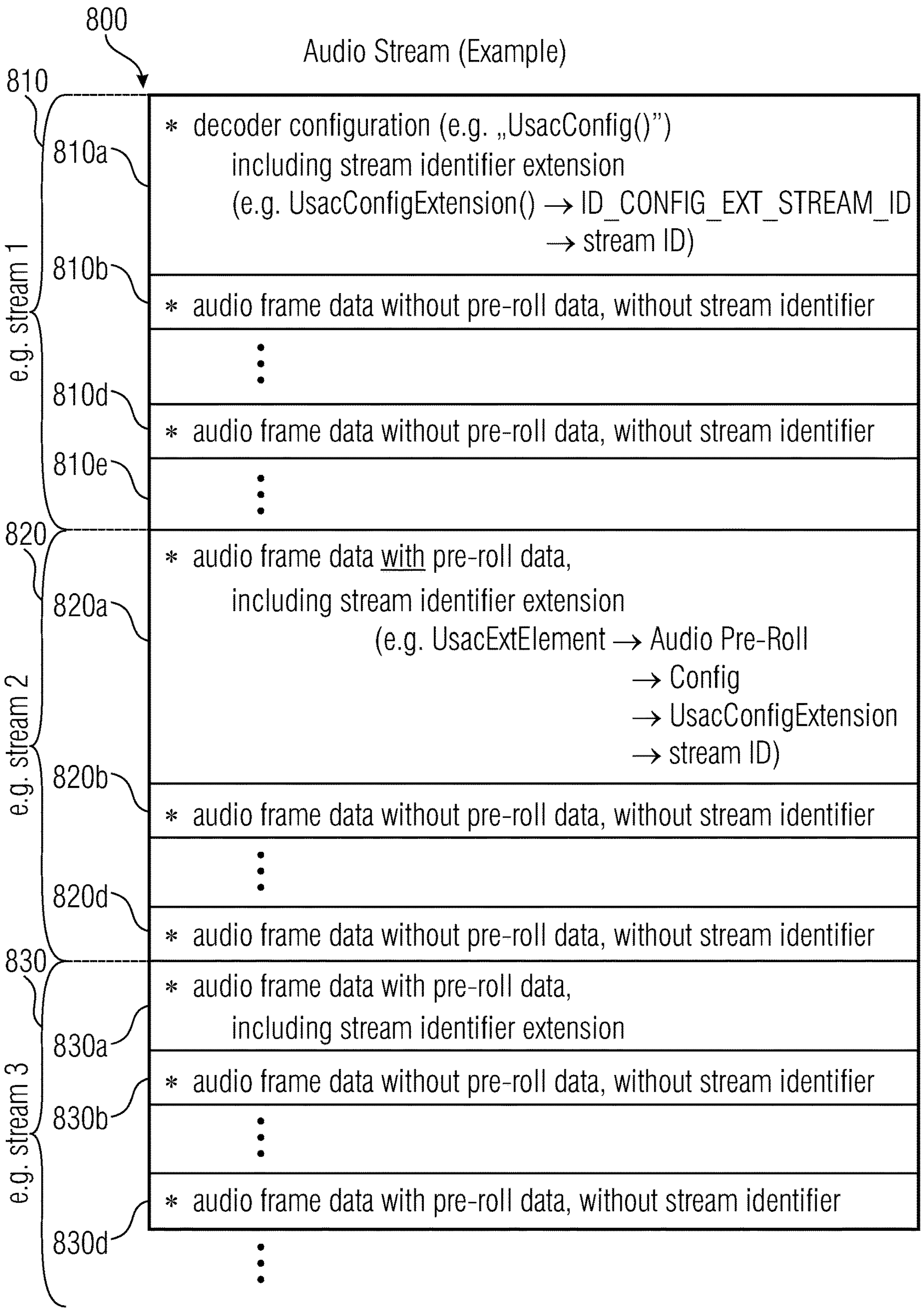
FIG. 8 shows a representation of an example audio stream, according to an embodiment of the present invention.

FIG. 8 shows a representation of an example audio stream, according to another embodiment of the present invention.

The audio stream according to FIG. 8 is designated in its entirety with 800.

It should be noted that information units 810*a* to 810*e* belong to a first audio stream. For example, an information unit 810*a* may comprise a decoder configuration and may, for example, follow the bit stream syntax "UsacConfig( )" as defined in the USAC standard. The decoder configuration may, for example, comprise a configuration structure which may be similar to the configuration structure 222*c*. For example, the information unit 810 may include a stream identifier extension, wherein the stream identifier may, for example, be included in a configuration extension structure of the configuration structure.

Information unit 810*b* may, for example, comprise audio frame data (like, for example, encoded spectral values and encoded scale factor information) without pre-roll data and without a stream identifier. Information unit 810*d* may be similar or identical in structure with the information unit 810*b* and also represent audio frame data without pre-roll data and without a stream identifier.

Moreover, the audio stream may comprise a portion 820, which follows the portion 810, and which is associated to a second audio stream which is different from the first audio stream. The portion 820 comprises an information unit 820*a*, which comprises audio frame data with pre-roll data, wherein the pre-roll data include (for example, within a configuration structure) a stream identifier extension. Thus, the information unit 820*a* represents an audio frame. If an audio decoder finds, on the basis of the stream identifier extension, that a previously decoded audio frame was from another audio stream, the pre-roll data may be used by the audio decoder to set the audio decoder to a proper state before decoding the audio frame data in the information unit 820*a*. Thus, the information unit 820*a* is well-suited to be the first information unit after a switching between different audio streams.

The block 820 also comprises one, two or more information units 820*b*, 820*d*, which comprise audio frame data but which do not comprise pre-roll data and which also do not comprise a stream identifier.

Data stream 800 also comprises a portion 830, which is associated with a third audio stream. The portion 830 comprises an information unit 830*a*, which comprises audio frame data with pre-roll data and which includes a stream identifier extension. The portion 830 further comprises an information unit 830*b* which comprises audio frame data without pre-roll data and without a stream identifier. The third portion 830 also comprises an information unit 830*d* which comprises audio frame data with pre-roll data but without a stream identifier.

Thus, it can be seen that the audio stream 800 comprises subsequent portions which originate from different audio streams, wherein at each transition from one stream to another, there is an information unit (for example, an encoded audio frame) which comprises audio frame data with pre-roll data and with a stream identifier. Accordingly, since there is stream identifier information available at each switching from an audio stream to an another audio stream within the encoded audio frame, the audio decoder can easily recognize said transition by evaluating the stream identifier (for example, in terms of a comparison with a stored stream identifier obtained previously).

It should be noted that the audio stream could be provided by the audio encoder or by the bit stream provider described herein, and that the audio stream 800 could be evaluated by the audio decoder described herein.

8. Decoder Functionality According to FIG. 9

Figure 9:
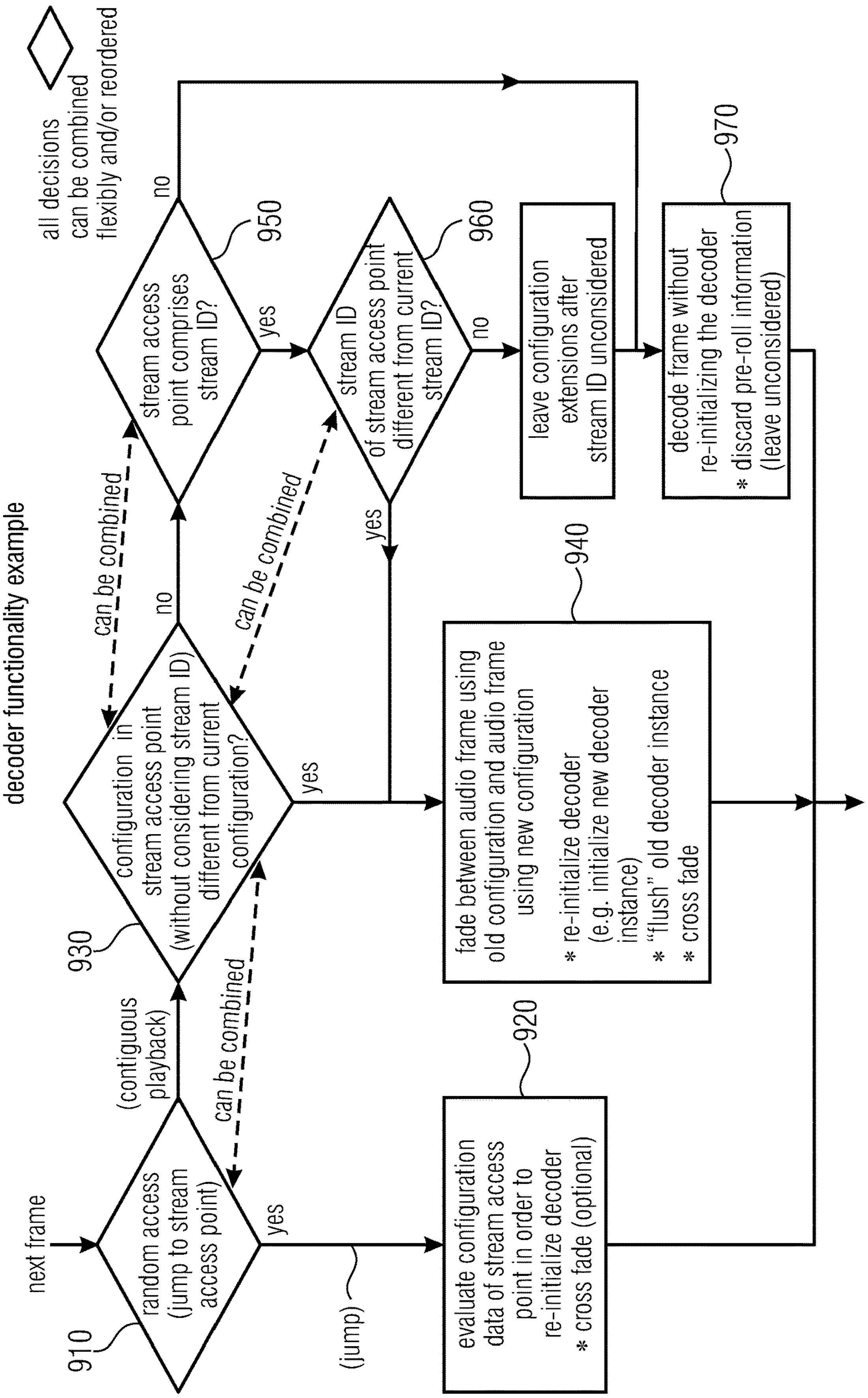
FIG. 9 shows a schematic representation of a possible decoder functionality of an audio decoder as described herein.

FIG. 9 shows a schematic representation of a possible decoder functionality of an audio decoder as described herein.

For example, the functionality as described with reference to FIG. 9 may be implemented in the audio encoder 100 according to FIG. 1 or in the audio decoder 200 according to FIGS. 2*a* and 2*b*. For example, the functionality described in FIG. 5 can be used to decide how to continue with the decoding.

However, it should be noted that the functionality as described taking reference to FIG. 9 is an example only, and that, for example, an order of the decision can be changed as far as the overall functionality remains the same. Also, it is possible to combine decisions provided that the overall functionality is not modified.

It is assumed that the functionality as explained in FIG. 9 has knowledge about an information regarding previously decoded frames and evaluates a new audio frame, which may comply with the syntax described herein.

For example, in a first check 110, the audio decoder may check whether there is a "random access", i.e., a jump operation to a stream access point. If it is recognized that there is a jump to a stream access point, wherein the "normal" order of the frames is intentionally changed, the decoder functionality proceeds with a step 920 of evaluating configuration data of the stream access point in order to re-initialize the decoder. A cross fade may optionally be performed in order to avoid an abrupt switching. It should be noted that a random access means "jumping" from a first frame to a second frame, wherein the second frame has a frame index which is not directly behind the frame index of the previously decoded frame. In other words, a random access is a jumping from a frame having frame index n to a frame having a frame index o, wherein o is different from n+1.

In the step 920, the jump is performed, wherein the jump target is a frame which is an immediate playout frame and which comprises sufficient information to re-initialize the decoder.

However, if it is found in the check 910 that there is no "random access" but rather a "contiguous playback" a further check 930 may be performed. In other words, the check 930 is performed if the decoding proceeds from frame having frame index n to a frame having frame index n+1.

In the check 930, it is checked whether a (relevant) configuration defined in a configuration structure of a stream access point (or intermediate playout frame) without considering a stream identifier (for example, up to but not including the stream identifier) is different from a current configuration. If the (relevant) configuration described in a configuration structure of the stream access point is different from the current configuration (path "yes"), the decoding may proceed at step 940. However, it should be noted that step 930 can naturally only be executed if the next frame is a stream access point which comprises a configuration structure. If the next frame does not comprise a configuration structure, step 930 naturally cannot be executed and no difference from the current configuration can be found.

However, if it is found, in step 930, that the configuration in the configuration structure of the next frame (without considering the stream identifier) is identical to the current configuration, a next check is made which is shown in block 950. In the step 950, it is determined whether the stream access point comprises (for example, within the configuration structure) a stream identifier. For example, the stream identifier does not necessarily need to be included but is only included in the configuration structure if there is a configuration extension structure and if this configuration extension structure actually comprises a data structure element which is a stream identifier. If it is found, in the comparison 950, that the stream access point comprises a stream identifier (branch "yes"), the stream identifier included in the stream access point of the next frame (frame to be decoded) is compared with the current (stored) stream identifier. If it is found that the stream identifier included in the next frame (frame to be decoded) is different from the current stream identifier (branch "yes" of decision 960) a jump is made to block 940. On the other hand, if is found that the stream identifier of the next frame is identical to the stored stream identifier, the further configuration information (for example, configuration extensions) which follow in the configuration extension structure after the stream identifier, are left unconsidered for the determination whether to perform a "transition" or the initial initialization (branch "no" of step 960).

However, if it found in check 950 that the stream access point (the next frame to be decoded) does not comprise a stream identifier, or if it is found that the stream identifier of the next frame to be decoded is equal to the stored stream identifier, the procedure continues at step 970.

Furthermore, it should be noted that step 940 comprises fading between an audio frame using an old configuration and an audio frame using a new configuration. For the decoding of the audio frame using the new configuration, there is a re-initialization of the audio decoder (which may comprise initializing a new decoder instance). Also, the old decoder instance is "flush" and a cross fade is performed.

On the other hand, step 970 comprises decoding the next frame without re-initializing the decoder, wherein a pre-roll information, which may be included in the next frame, is discarded (left unconsidered).

To conclude, there are different possibilities which can be executed whenever the audio decoder arrives at an "intermediate playout frame" which can also be considered as a "stream access point". Also, it should be noted that no specific processing is typically made at frames which are not "intermediate playout frames" or "stream access points" because such frames do not allow for a re-initialization of an audio decoder since there is no configuration structure and no pre-roll information available in such audio frames.

When a decoder knows that there is a "jump", i.e., a deviation from a normal frame ordering, there is naturally a re-initialization of the audio decoder which typically uses the pre-roll information and also a new configuration structure (even when jumping within the same stream).

If there is no such "jump", there are different cases:

If the audio decoder finds that the configuration information of a next stream to be decoded, up to and including the configuration identifier, is different from a stored information, there will also be a re-initialization of the audio decoder. On the other hand, if the audio decoder finds that the configuration information of the next frame to be decoded, up to and including the stream identifier (if present), is identical to the stored information obtained from a previously decoded frame, no re-initialization will be performed. In any case, configuration information which is placed after the stream identifier in the configuration structure will be neglected by the audio decoder when deciding whether to perform a re-initialization or not. Also, if the audio decoder finds that there is no stream identifier within the configuration structure, he will naturally not consider the stream identifier in the comparison with the stored information.

However, to perform the evaluation in a computationally efficient manner, the decoder may first check the configuration information preceding the stream identifier with the stored configuration information, then check whether there is a stream identifier included in the configuration structure, and then proceed with a comparison of the stream identifier (if present in the configuration structure) with a stored stream identifier. As soon as the audio decoder finds a difference, he may decide for a re-initialization. On the other hand, if the audio decoder does not find a discrepancy between the configuration information, up to an including the stream identifier, he may decide to omit a re-initialization.

Accordingly, minor configuration changes, which should not result in a re-initialization, can be signaled after the stream identifier in the configuration extension structure by an audio encoder and the audio decoder can, in this case, proceed to decode with only a slightly changed configuration (which does not require re-initialization).

To conclude, the decoder functionality as described taking reference to FIG. 9 can be used in any of the audio decoders described herein, but should be considered as being optional.

9. Bitstream Syntax According to FIGS. 10*a*, 10*b*, 10*c* and 10*d*

In the following, a bit stream syntax will be described. In particular, a syntax of a configuration structure will be described. As an example, a syntax of a configuration structure "UsacConfig( )" will be described, which can take the place of the configuration structure 222*c* or of the configuration structure 332 or of the configuration structure 424 or of the configuration structure "Config( )" shown in FIG. 6 or the configuration structure "UsacConfig( )" as shown in FIG. 7 or of the configuration structure "Config" shown in FIG. 8.

FIG. 10 shows a representation of the configuration structure "UsacConfig( )". As can be seen, said configuration structure may, for example, comprise a sampling frequency index information 1020*a* and, optionally, a sampling frequency information 1020*b*. The sampling frequency index information 1020*a* (possibly in combination with the sampling frequency information 1020*b*), for example, describes the sampling frequency used by an encoder and, therefore, also describes the sampling frequency to be used by an audio decoder.

Moreover, the configuration structure may also comprise a frame length index information for a spectral band replication (SBR). For example, the index may determine a number of parameters for a spectral bandwidth replication, for example as defined in the USAC standard.

Moreover, the configuration structure may also comprise a channel configuration index 1024*a* which may, for example, determine a channel configuration. A channel configuration index information may, for example, define a number of channels and an associated loudspeaker mapping. For example, the channel configuration index information may have the meaning as defined in the USAC standard. For example, if the channel configuration index information is equal to zero, details regarding a channel configuration may be included in a "UsacChannelConfig( )" data structure 1024*b*.

Moreover, the configuration structure may comprise a decoder configuration information 1026*a* which may, for example, describe (or enumerate) information elements which are present in an audio frame data structure. For example, the decoder configuration information may comprise one or more of the elements which are described in the USAC standard.

Moreover, the configuration structure 1010 also comprises a flag (for example, named "UsacConfigExtensionPresent") which indicates the presence of a configuration extension structure (for example, the configuration extension structure 226). The configuration structure 1010 also comprises the configuration extension structure, which is, for example, designated with "UsacConfigExtension( )" 1028*a*. The configuration extension structure is advantageously a part of the configuration structure 1010 and may, for example, be represented by a bit sequence which immediately follows the bits representing the other configuration items of the configuration structure 1010. The configuration extension structure may, for example, carry the stream identifier information, as will be described below.

In the following, a possible syntax of the configuration extension structure will be described taking reference to the FIG. 10*b*, wherein the configuration extension structure is designated in its entirety with 1030 and corresponds to the configuration extension structure 1028*a*.

The configuration extension structure (also designated as "UsacConfigExtension( )") may, for example, encode a number of configuration extensions in a syntax element 1040*a*. It should be noted that the order of different configuration extension information items can be chosen arbitrarily, since there is a configuration extension type information 1042*a* and a configuration extension length information 1044*a* for each configuration extension item. Accordingly, the configuration extension structure 1030 can carry a plurality of configuration extension items (or configuration extension information items) in a variable order, wherein an audio encoder can determine which configuration extension item is encoded first and which configuration extension item is encoded later. For example, for each configuration information item, there may first be a configuration extension type identifier 1042*a*, followed by a configuration extension length information 1044, and then there may be the "payload" of the respective configuration extension information item. The encoding of the payload of the respective configuration extension information item may, for example, vary depending on the type of the configuration extension information item indicated by the configuration extension type information, and the length of the payload of the respective configuration extension information item may be determined by the value of the respective configuration extension length information 1044*a*. For example, in case the configuration extension information item is a fill information, there may be one or more fill bytes. On the other hand, if the configuration extension information item is a configuration extension loudness information, there may be a data structure comprising an information about the loudness (for example, designated as "loudnessInfoSet( )").

Furthermore, if the configuration extension information item is a stream identifier, there may be a number representation of a stream identifier which is designated as "streamId( )". Syntax examples for different types of configuration extension information items are shown at reference numerals 1046*a*, 1048*a* and 1050*a*.

To conclude, the syntax of the configuration extension structure is such that the order of different configuration information items can be varied. For example, the stream identifier configuration extension information item can be placed before or after other configuration extension information items by an audio encoder. Accordingly, the audio encoder can control, by the placement of the stream identifier configuration extension information item within the configuration extension structure, which other information items of the configuration extension structure should be considered in a comparison between the configuration indicated by the current configuration structure and a configuration information previously acquired by an audio decoder. Typically, the configuration information items preceding the configuration extension structure and any configuration extension information items up to and including the stream identifier information will be considered in such a comparison, while any configuration extension information items which are encoded in the bit stream after the stream identifier configuration extension information item will be neglected in the comparison.

Thus, the configuration structure as explained with respect to FIGS. 10*a* and 10*b* is well-suited for the concept according to the present invention.

FIG. 10 shows a syntax of the stream identifier (configuration extension) information item, which is also designated with "StreamId( )" (or with "streamId( )"). As can be seen, the stream identifier can be represented by a 16 bit binary number representation. Accordingly, more than 65000 different values can be encoded as the stream identifier, which is typically sufficient to recognize any transitions between different audio streams.

FIG. 10*d* shows an example of an allocation of type identifiers for different configuration extension information items. For example, a configuration extension information item of type "stream identifier" may be represented by a value of seven of the configuration extension type information 1042*a*. Other types of configuration extension information items may, for example, be represented by other values of the configuration extension type identifier 1042*a*.

To conclude, FIGS. 10*a* to 10*d* describe a possible syntax (or syntax extension) of a configuration structure which may be used by an audio encoder for encoding a stream identifier information which may be used by an audio decoder for extracting a stream identifier information.

However, it should be noted that the configuration structure described here should only be considered as an example and can be modified over a wide range. For example, the sampling frequency index information and/or the sampling frequency information and/or the spectral-bandwidth-replication frame length index information and/or the channel configuration index information could be encoded in a different manner. Also, optionally, one or more of the above mentioned information items could be dropped. Moreover, the UsacDecoderConfig information item could also be omitted.

Moreover, the encoding of the number of configuration extensions, of the configuration extension types and of the configuration extension length could be modified. Also, the different configuration extension information items should also be considered as optional, and could possibly also be encoded in a different manner.

Furthermore, the stream identifier could also be encoded with more or less bits, wherein different types of number representation could be used. Furthermore, the allocation of identifier numbers to different configuration extension types should be considered as an advantageous example but not as an essential feature.

9. Conclusions

In the following, some aspects according to the invention will be described, which can be used individually or when taken in combination with the embodiments described herein.

In particular, a solution according to the present invention will be described herein.

It should be noted that aspects of embodiments according to the present invention are described by the enclosed claims.

However, embodiments as defined by the claims can optionally be supplemented by any of the features described herein, either individually or in combination. Also, it should be noted that any definitions in parentheses "( )" or "[ ]" should be considered as being optional, in particular when used in the claims.

Nevertheless, it should be noted that features of the invention described in the following may also be used separately from the features of the claims.

Furthermore, features and functionalities described in the claims and described in the following can optionally be combined with features and functionalities described in the section describing problems underlying aspects of the invention, possible use scenarios for embodiments and conventional approaches. In particular, features and functionalities described herein can be used in a USAC audio decoder according to ISO/IEC 23003-3: 2012, including amendment 3, sub-clause "bit rate adaptation" (for example, as standardized on the filing date of the priority application of the present application, or as standardized on the filing date of the present invention, but also—optionally—including further future modifications).

According to an aspect of the invention, it is proposed to introduce (for example, into a USAC bit stream syntax) a new configuration extension for USAC with usacConfigExtType==ID_CONFIG_EXT_STREAM_ID with an associated bit stream structure containing a simple universal 16 bit identifier bit field. This identifier shall be different (may, for example, be chosen different by an audio encoder or by an audio stream provider) between any two configuration structures for all streams within a set of streams which are intended for a seamless switching between them. One example for such a set of streams is a so-called "adaptation set" in an MPEG-DASH delivery use case.

The proposed unique stream ID configuration extension will, for example, ensure that at a point of comparing the current (or the current configuration) with a new configuration structure (for example, at the side of an audio encoder or at the side of an audio decoder), the new configuration (and hence the new stream) is correctly identified and the decoder will be behave as expected and intended, for example, the decoder will conduct a proper decoder flush, pre-rolling of access units and performing a cross fade (if applicable).

The following is a proposed specification text (modification) (for example, of MPEG-D USAC (ISO/IEC 23003-3+AMD.1+AMD-2+AMD.3) as standardized on the filing date of the present application or as standardized on the filing date of the priority application, and optionally comprising any future modifications).

The passages mentioned in the following described aspects of the invention which can be used individually or in combination with a USAC audio decoder or within another frame-based audio decoder.

A configuration extension, as shown in the following table 15, can be used by an audio encoder, in order to provide an audio bit stream and can be used by an audio decoder in order to extract information from an audio bit stream.

When using an audio encoding and decoding according to the USAC standard mentioned above, table 15 in section 5.2 should be replaced by the following updated version of table 15:

TABLE 15

Syntax of UsacConfigExtension( )

```
Syntax                                                                   No. of bits  Mnemonic

UsacConfigExtension( )
{
  numConfigExtensions = escapedValue(2,4,8) + 1;                                      Encoding
                                                                                      can vary
  for (confExtIdx=0; confExtIdx<numConfigExtensions; confExtIdx++) {                  Encoding
    usacConfigExtType[confExtIdx]              =                                      can vary
escapedValue(4,8,16);                                                                 Encoding
    usacConfigExtLength[confExtIdx]        =                                          can vary
escapedValue(4,8,16);
    switch (usacConfigExtType[confExtIdx]) {                                          Optional
    case ID_CONFIG_EXT_FILL:
      while (usacConfigExtLength[confExtIdx]--) {
        fill_byte[i]; /* should be '10100101' */                         8            Uimsbf
      }
      break;
```

TABLE 15-continued

| Syntax of UsacConfigExtension( ) | | |
|---|---|---|
| Syntax | No. of bits | Mnemonic |
| case ID_CONFIG_EXT_LOUDNESS_INFO: | | Optional |
| loudnessInfoSet( ) | | |
| break; | | |
| case ID_CONFIG_EXT_STREAM_ID: | | idea |
| streamId( ); | | according |
| break; | | to invention |
| default: | | |
| while (usacConfigExtLength[confExtIdx]−−) { | | Optional |
| tmp; | 8 | Uimsbf |
| } | | |
| break; | | |
| } | | |
| } | | |
| } | | |

Also, when considering an audio encoding or an audio decoding according to the USAC standard, at the end of section 5.2 of the USAC standard, a new table AMD.01 as follows should be added (wherein encoding details, number of bits are optional):

TABLE AMD.01

| Syntax of StreamId( ) | | |
|---|---|---|
| Syntax | No. of bits | Mnemonic |
| StreamId( ) | | |
| { | | |
| streamIdentifier | 16 | Uimsbf |
| } | | |

However, in said tables, encoding details and, for example, a number of bits should be considered as being optional.

Moreover, when considering an encoding or decoding according to the USAC standard, the following sub-clause 6.1.15 should be added after "6.1.14 UsacConfigExtension( )":

"6.1.15 Unique Stream Identifier (Stream ID)

6.1.15.1 Terms, Definitions and Semantics

| | |
|---|---|
| streamIdentifier | a two byte unsigned integer stream identifier (stream ID) that shall uniquely identify a configuration of a stream within a set of associated streams that are intended for seamless switching between them. streamIdentifier can take values from 0 to 65535. (encoding details are optional) |

EXAMPLE

When being part of an MPEG-DASH adaptation set as defined in ISO/IEC 23009, all stream IDs of streams in that DASH adaptation set shall be pairwise distinct.

6.1.15.2 Stream Identifier Description

Configuration extensions of type ID_CONFIG_EXT_STREAM_ID provide a container for signalling a stream identifier (short: "stream ID"). The stream ID config extension allows attaching a unique integer number to a configuration structure such that audio bit stream configurations of two streams can be distinguished even if the rest of the configuration structure is (bit-) identical.

The usacConfigExtLength of a config extension of type ID_CONFIG_EXT_STREAM_ID shall have the value 2 (two). (optional, could be different as well)

Any given audio bit stream shall not have more than one configuration extension of type ID_CONFIG_EXT_STREAM_ID. (optional)

If a regularly operating decoder instance receives a new configuration structure, for example by means of a Config ( ) in an ID_EXT_ELE_AUDIOPREROLL extension payload, it shall compare this new configuration structure with the currently active configuration (see, for example, 7.18.3.3). Such comparison may, for example, be conducted by means of a bit-wise comparison of the corresponding configuration structures.

If the configuration structures contain configuration extensions then, for example, all configuration extensions up to and including the configuration extension of type ID_CONFIG_EXT_STREAM_ID shall be included in the comparison. All configuration extensions following configuration extension of type ID_CONFIG_EXT_STREAM_ID shall, for example, not be considered during the comparison. (optional)

NOTE The above rule allows an encoder to control whether changes in particular configuration extensions shall cause a decoder reconfiguration or not."

It should be noted that definitions and details from this passage to be added to the standard can optionally be used in embodiments according to the present invention, both individually and taken in combination.

When considering an USAC encoding or decoding, table 74 in clause 6 should be replaced by the table as shown in FIG. 10*d*.

To conclude some possible changes which may be introduced into the USAC standard have been described. However, the concept as described here may also be used in connection with other audio coding standards. In other words, it would also be possible to introduce into some configuration structure of any other audio coding standard, a stream identifier information, as described here.

The features described here with respect to the stream identifier information could also be applied when taken in combination with other coding standards. In this case, the terminology should be adapted to the terminology of the respective audio coding standard.

In the following, some optional effects and advantages or features according to the present invention will be described.

The presented configuration extension provides an easily implementable solution to distinguish between configuration structures which are otherwise bit-identical. The gained distinguishability between configurations enables, for example, correct and originally intended functionality of dynamic adaptive streaming with seamless transitions between streams.

In the following, some alternative solutions will be described.

For example, the problem mentioned above could be avoided if the encoder ensures that all streams within a set of streams have different configurations, i.e., they make use of different encoding tools or use different parametrizations. If the differences in bit rate of the individual streams are large enough, this usually results in configurations that are pairwise distinct. If a fine grid of bitrates is used, which is often the case, the (conventional) solution will, in some cases, not work.

In contrast, by using a stream identifier, which is included in a configuration portion (also designated as configuration structure), to distinguish different streams, streams can also be distinguished if the rest of the configuration structure is identical (which is sometimes the case if bit rates are similar).

Alternatively (for example as an alternative to using a stream identifier), one could create an appropriate, unspecified configuration extension that is varying for each stream but is somehow differently structured. The effect would be the same. Though correct functionality cannot be guaranteed, because it cannot be guaranteed that all decoder implementations evaluate this unspecified configuration extension when configurations are compared in the above described scenario.

In contrast, embodiments according to the invention create a concept in which a stream identifier is clearly specified in a configuration structure and allows for well-defined distinction of different streams.

It should be noted that the implementation of the inventive concept can be recognized by an analysis of the configuration structure of USAC streams. Moreover, implementations of the inventive concept can be recognized by testing for the presence of configuration extensions as described above.

In the following, some possible fields of application for aspects according to the invention will be described.

Embodiments according to the invention provide for a distinguishability of otherwise identical data structures.

Further embodiments according to the invention provide for a distinguishability of otherwise identical audio codec configuration structures.

Embodiments according to the invention allow for a seamless dynamic adaptive streaming of audio over any transmission network.

In the following, some further aspects will be described, which should be considered as being optional.

For example, an audio encoder/audio stream provider behavior will be described in the following. In the following, some optional details regarding the audio encoder (which may also take the form of an audio stream provider) will be described.

The audio encoder usually does not generate one (single) stream which suddenly changes its configuration, but the encoder or an encoder framework comprising multiple encoder instances generates multiple streams in parallel which respectively comprise, at synchronized positions (points of time) within the streams, IPFs ("immediate play-out frames").

A decoder framework then selects, according to specific and/or predetermined criteria, like, for example, a quality of an internet connection, one of the streams generated in parallel and "asks" (or requests) an encoder-sided server to send exactly that stream and then forwards the stream to the decoder. All further encoded streams are simply ignored. A change between streams is then only allowed at the IPFs.

The audio decoder initially does not recognize such a change and/or is not informed about such a change, for example, by the decoder framework. Rather, the audio decoder needs to detect a stream change by a comparison of the embedded configuration structures ("Config-structures"). From the decoder's view, it appears as if the encoder had only generated a stream with a changing configuration ("Config"). Actually, this is usually not the case. Rather, multiple variants (comprising different bit rates) are (continuously) generated in parallel by the encoder; only the decoder framework and the encoder-side server (or stream provider) split-up the streams and re-arrange (re-concatenate) portions of the streams (or the streams).

Further optional details are shown in the Figures.

Moreover, it should be noted that the apparatuses shown in the figures can be supplemented by any of the features and functionalities described herein, either individually or in combination.

To conclude, an audio encoder or an audio stream provider may switch between a provision of different streams to a certain audio decoder (or to an audio decoding device), wherein the switching may be performed, for example, at the request of the audio decoder or the audio decoding device, or at the request of any other network management device, or even by a decision of the audio encoder or audio stream provider. The switching between the provision of frames from different audio streams may be used to adapt the actual bit rate to an available bit rate. The decoder configuration, which is signaled from an audio encoder (or audio stream provider) to an audio decoder may be identical between different streams, but the stream identifier should be different between different streams. Accordingly, the audio decoder can recognize, using the stream identifier, when a re-initialization of the audio decoder should be done using the additional information (for example, configuration information and pre-roll information) included in an immediate playout frame.

To further conclude, using a stream identifier ("streamID"), as described herein, may overcome the problems mentioned in the section describing problems underlying aspects of the invention and possible use scenarios for embodiments.

10. Methods

Figure 11A:
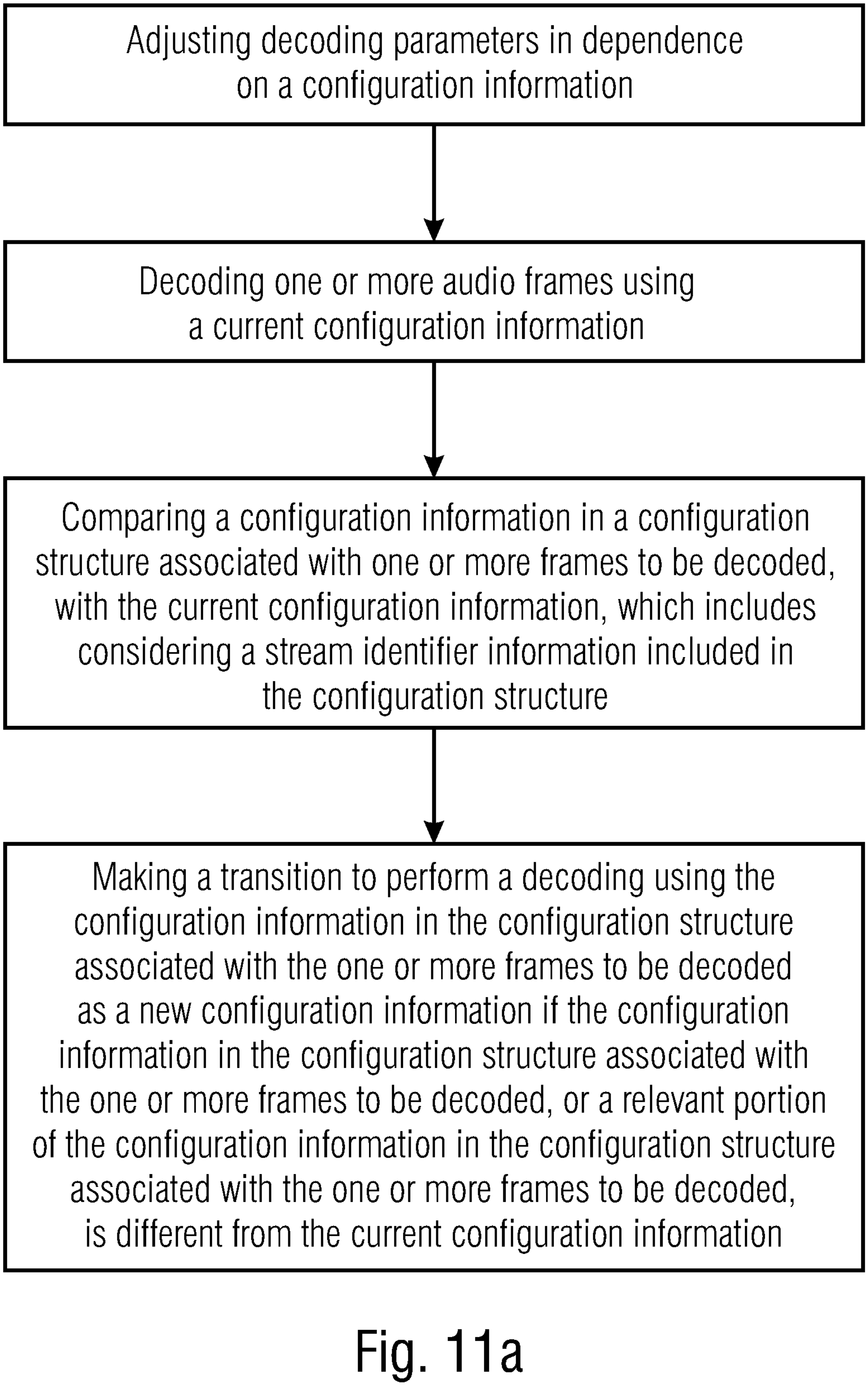
FIG. 11*a* shows a flowchart of a method for providing a decoded audio signal representation on the basis of an encoded audio signal representation, according to an embodiment of the present invention.
Figure 11B:
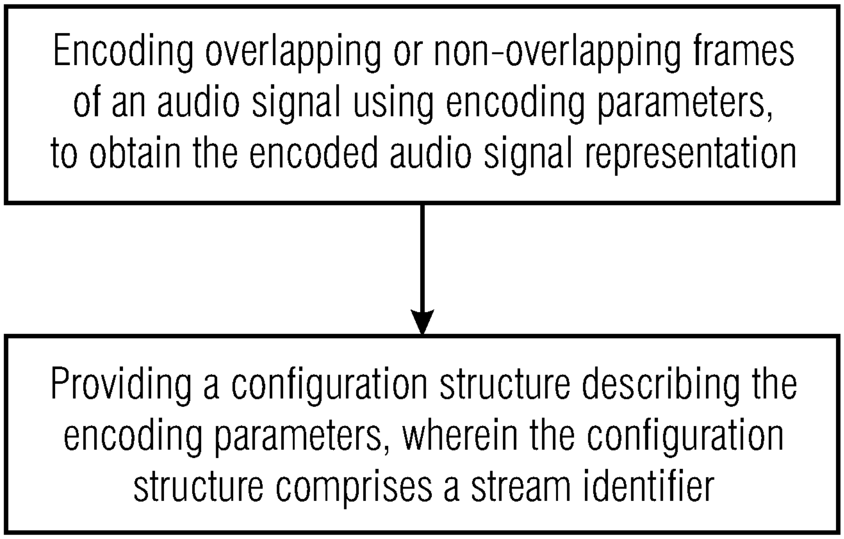
FIG. 11*b* shows a flowchart of a method for providing an encoded audio signal representation, according to an embodiment of the present invention.
Figure 11C:
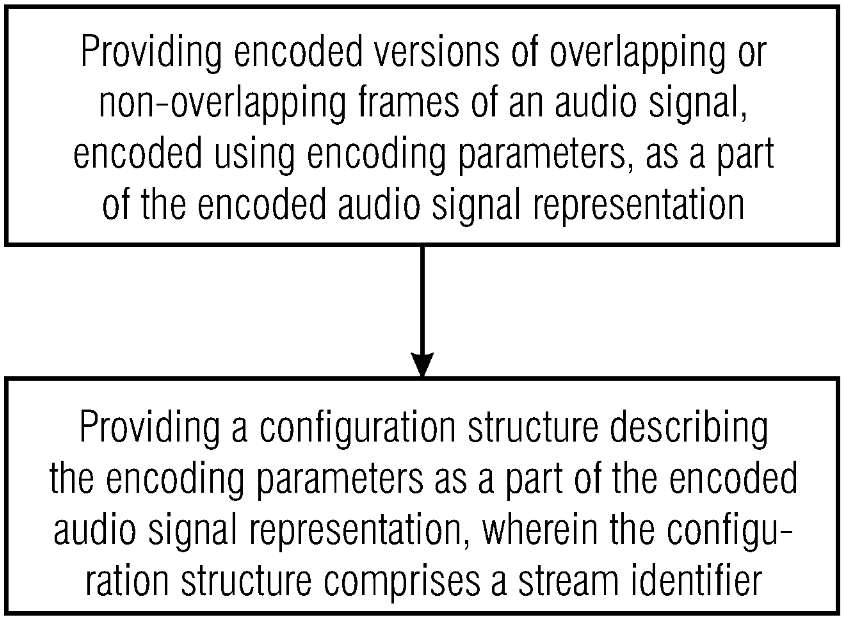
FIG. 11*c* shows a flowchart of a method for providing an encoded audio signal representation, according to an embodiment of the present invention.

FIGS. 11*a* to 11*c* show flow charts of methods according to embodiments according to the present invention.

The Methods as shown in FIGS. 11*a* to 11*c* can be supplemented by any of the features and functionalities described herein.

11. Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An audio decoder for providing a decoded audio signal representation on the basis of an encoded audio signal representation, wherein the audio decoder is configured to adjust decoding parameters in dependence on a configuration information, wherein the audio decoder is configured to decode one or more audio frames using a current configuration information, and wherein the audio decoder is configured to compare a configuration information in a configuration structure associated with one or more frames to be decoded, with the current configuration information, and to make a transition to perform a decoding using the configuration information in the configuration structure associated with the one or more frames to be decoded as a new configuration information if the configuration information in the configuration structure associated with the one or more frames to be decoded, or a relevant portion of the configuration information in the configuration structure associated with the one or more frames to be decoded, is different from the current configuration information;

wherein the audio decoder is configured to consider a stream identifier information comprised by the configuration structure when comparing the configuration information, such that a difference between a stream identifier previously acquired by the audio decoder and a stream identifier represented by the stream identifier information in the configuration structure associated with the one or more frames to be decoded causes to make the transition;

wherein the audio decoder is configured to bring a state of an audio decoding to a desired state using a pre-roll information when making a transition.

2. A method for providing a decoded audio signal representation on the basis of an encoded audio signal representation, wherein the method comprises adjusting decoding parameters in dependence on a configuration information, wherein the method comprises decoding one or more audio frames using a current configuration information, and wherein the method comprises comparing a configuration information in a configuration structure associated with one or more frames to be decoded, with the current configuration information, and wherein the method comprises making a transition to perform a decoding using the configuration information in the configuration structure associated with the one or more frames to be decoded as a new configuration information if the configuration information in the configuration structure associated with the one or more frames to be decoded, or a relevant portion of the configuration information in the configuration structure associated with the one or more frames to be decoded, is different from the current configuration information;

wherein the method comprises considering a stream identifier information comprised by the configuration structure when comparing the configuration information, such that a difference between a stream identifier previously acquired in the audio decoding and a stream identifier represented by the stream identifier information in the configuration structure associated with the one or more frames to be decoded causes to make the transition;

wherein the method comprises bringing a state of an audio decoding to a desired state using a pre-roll information when making a transition.

3. A non-transitory digital storage medium having a computer program stored thereon to perform the method for providing a decoded audio signal representation on the basis of an encoded audio signal representation, wherein the method comprises adjusting decoding parameters in dependence on a configuration information, wherein the method comprises decoding one or more audio frames using a current configuration information, and wherein the method comprises comparing a configuration information in a configuration structure associated with one or more frames to be decoded, with the current configuration information, and wherein the method comprises making a transition to perform a decoding using the configuration information in the configuration structure associated with the one or more frames to be decoded as a new configuration information if the configuration information in the configuration structure associated with the one or more frames to be decoded, or a relevant portion of the configuration information in the configuration structure associated with the one or more frames to be decoded, is different from the current configuration information;

wherein the method comprises considering a stream identifier information comprised by the configuration structure when comparing the configuration information, such that a difference between a stream identifier previously acquired in the audio decoding and a stream identifier represented by the stream identifier information in the configuration structure associated with the one or more frames to be decoded causes to make the transition, wherein the method comprises bringing a state of an audio decoding to a desired state using a pre-roll information when making a transition;

when said computer program is run by a computer.

* * * * *